US010659849B2

(12) United States Patent
Deshpande

(10) Patent No.: US 10,659,849 B2
(45) Date of Patent: May 19, 2020

(54) SYSTEMS AND METHODS FOR SIGNALING OF EMERGENCY ALERT MESSAGES

(71) Applicant: Sharp Kabushiki Kaisha, Sakai, Osaka (JP)

(72) Inventor: Sachin G. Deshpande, Camas, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/323,531

(22) PCT Filed: Jul. 24, 2017

(86) PCT No.: PCT/JP2017/026701
§ 371 (c)(1),
(2) Date: Feb. 6, 2019

(87) PCT Pub. No.: WO2018/030133
PCT Pub. Date: Feb. 15, 2018

(65) Prior Publication Data
US 2019/0174204 A1    Jun. 6, 2019

Related U.S. Application Data

(60) Provisional application No. 62/374,698, filed on Aug. 12, 2016, provisional application No. 62/400,593, filed on Sep. 27, 2016.

(51) Int. Cl.
*H04N 21/234* (2011.01)
*H04N 21/81* (2011.01)
*H04H 20/59* (2008.01)
*H04N 21/236* (2011.01)
*H04N 21/2362* (2011.01)
*H04N 21/434* (2011.01)
(Continued)

(52) U.S. Cl.
CPC .......... *H04N 21/814* (2013.01); *H04H 20/59* (2013.01); *H04N 21/2362* (2013.01); *H04N 21/23614* (2013.01); *H04N 21/4345* (2013.01); *H04N 21/4348* (2013.01); *H04N 21/4882* (2013.01); *H04N 21/8358* (2013.01)

(58) Field of Classification Search
CPC .......................... H04N 21/234; H04N 21/235
See application file for complete search history.

(56) References Cited

U.S. PATENT DOCUMENTS 6,658,456 B1    12/2003  Shimoosawa
9,311,811 B1 *   4/2016  Szewczyk ............... G06F 16/33
(Continued)

OTHER PUBLICATIONS

CEA/SCTE Standard; "Emergency Alert Message for Cable"; J-STD-42-B (also known as CEA-814-B; also known as SCTE 18:2012); Oct. 2013; 40 pages.
(Continued)

*Primary Examiner* — Mushfikh I Alam
(74) *Attorney, Agent, or Firm* — Keating & Bennett, LLP

(57) ABSTRACT

A device may be configured to receive a low level signaling emergency alert message fragment from a broadcast stream. The device may parse syntax elements included in the emergency alert message fragment. The device may determine whether to retrieve a media resource associated with the emergency alert message based on the parsed syntax elements.

3 Claims, 10 Drawing Sheets

(51) Int. Cl.
*H04N 21/488* (2011.01)
*H04N 21/8358* (2011.01)

(56) References Cited

U.S. PATENT DOCUMENTS

| | | | |
|---|---|---|---|
| 2008/0009262 A1* | 1/2008 | Rudolf | H04W 4/029 455/404.1 |
| 2008/0120639 A1* | 5/2008 | Walter | G08B 27/005 725/33 |
| 2009/0133090 A1* | 5/2009 | Busse | H04N 7/163 725/132 |
| 2013/0169762 A1 | 7/2013 | Kanemaru et al. | |
| 2014/0143801 A1* | 5/2014 | Russell | H04N 21/814 725/33 |
| 2014/0282706 A1* | 9/2014 | Kim | H04N 21/233 725/33 |
| 2015/0088977 A1* | 3/2015 | Monesson | H04L 65/605 709/203 |
| 2015/0189486 A1 | 7/2015 | Lee et al. | |
| 2016/0192033 A1* | 6/2016 | Kitahara | H04N 21/41415 725/33 |
| 2016/0198240 A1* | 7/2016 | Kim | H04N 7/08 725/33 |
| 2018/0026733 A1* | 1/2018 | Yang | H04H 20/59 725/33 |
| 2019/0166390 A1* | 5/2019 | Kwak | H04N 21/814 |

OTHER PUBLICATIONS

Advanced Television Systems Committee; ATSC Candidate Standard: Content Recovery in Redistribution Scenarios (A/336); Doc. S33-178r2; Jan. 15, 2016; pp. 1-43.
Advanced Television Systems Committee; ATSC Candidate Standard: Signaling, Delivery, Synchronization, and Error Protection (A/331); Doc. S33-1-601r4; Jun. 21, 2016; 178 pages.
Advanced Television Systems Committee; ATSC Candidate Standard: Companion Device (A/338); Doc. S33-161r1; Dec. 2, 2015; pp. 1-31.
Advanced Television Systems Committee; ATSC Candidate Standard: Signaling, Delivery, Synchronization, and Error Protection (A/331); Doc. S33-174r3; Jun. 21, 2016; pp. 1-31.
Oasis Standard; "Common Alerting Protocol Version 1.2"; Jul. 1, 2010; pp. 1-47.

* cited by examiner

FIG. 1

Content Delivery Protocol Model 100

| OSI Model | Protocol Stack |
|---|---|
| Application | Applications — Signaling Object OR NRT Content Files; Media Codecs; Signaling Object OR Non-Real Time (NRT) Content Files; Media Codecs; Media Processing Unit (MPU) OR (ISO BMFF) |
| Presentation | Dynamic Adaptive Streaming over HTTP (MPEG-DASH) OR ISO Base Media File Format (BMFF) |
| Session | (Delivery) |
| Transport | Hypertext Transfer Protocol (HTTP); Real-time Object Delivery over Unidirectional Transport Protocol (ROUTE); MPEG Media Transport Protocol (MMTP); Low Level Signaling (LLS); Transmission Control Protocol (TCP); User Datagram Protocol (UDP); MPEG-2 TS |
| Network | Internet Protocol (IP) |
| Data Link | Broadband Physical AND Data Link; ATSC Link-Layer Protocol (ALP) |
| Physical | ATSC Broadcast Physical |

```
{
  "id": "http://atsc.org/version/3.0/a331/aeat#",
  "$schema": "http://json-schema.org/draft-04/schema#",
  "title": "ATSC 3.0 Advanced Emergency Alerting Table (AEAT)",
  "description": "AEAT Schema as defined in ATSC 3.0",
  "@context": {"AEAT": "http://www.atsc.org/contexts/3.0/AEAT/V1"},
  "AEAT": {
    "type": "object",
    "properties": {"AEA": {
      "type": "array",
      "items": {
        "type": "object",
        "properties": {
          "AEAid": {"type": "string"},
          "issuer": {"type": "string"},
          "audience": {"type": "string"},
          "AEAtype": {"type": "string"},
          "refAEAid": {"type": "string"},
          "Header": {
            "type": "object",
            "properties": {
              "effective": {"type": "string", "format": "date-time"},
              "expires": {"type": "string", "format": "date-time"},
              "EventCode": {
              "type": "object",
              "properties": {"value": {"type": "string"}, type": {"type": "string"}},
                "required": ["value", "type"]
              },
              "Location": {
                "type": "array",
                "items": {
                  "type": "object",
                  "properties": {
                    "value": {"type": "string"},
                    "type": {"type": "string"}
                  },
                  "required": ["value", "type"]
                },
                "minItems": 1
              }
            },
            "required": ["effective", "expires", "EventCode", "Location"]
          },
```

From FIG. 6A

```
    "AEATtext": {
              "type": "array",
              "items": {
                 "type": "object",
                 "properties": {"value": {"type": "string"}, "lang": {"type": "string"}},
                 "required": ["value", "lang" ]
              },
              "minItems": 1
           },
"Media": {
              "type": "array",
              "items": {
                 "type": "object",
                 "properties": {
                    "lang": {"type": "string"},
                    "mediaDesc": {"type": "string"},
                    "uri": {
                        "type": "string",
                        "format": "uri"
                    },
                    "contentType": {"type": "string"},
                    "contentLength": {"type": "integer"}
                 },
                 "required": ["uri"]
              },
              "minItems": 0
           },
           "Signature": {"type": "object"}
        },
        "required": ["AEAid", "issuer", "audience", "AEAtype", "Header", "AEAtext"]
      },
      "minItems": 1,
      "maxItems": 1
   }},
   "required": ["AEA"],
   "additionalProperties": true
  },
  "required": ["AEAT"]
}
```

FIG. 6B

```
{
  "id": "http://atsc.org/version/3.0/a331/aeat#",
  "$schema": "http://json-schema.org/draft-04/schema#",
  "title": "ATSC 3.0 Advanced Emergency Alerting Table (AEAT)",
  "description": "AEAT Schema as defined in ATSC 3.0",
  "@context": {"AEAT": "http://www.atsc.org/contexts/3.0/AEAT/V1"},
  "AEAT": {
    "type": "object",
    "properties": {"AEA": {
      "type": "array",
      "items": {
        "type": "object",
        "properties": {
          "AEAid": {"type": "string"},
          "issuer": {"type": "string"},
          "audience": {"type": "string"},
          "AEAtype": {"type": "string"},
          "refAEAid": {"type": "string"},
          "Header": {
             "type": "object",
             "properties": {
                "effective": {
                   "type": "string",
                   "format": "date-time"
                },
                "expires": {
                   "type": "string",
                   "format": "date-time"
                },
                "EventCode": {
                   "type": "object",
                   "properties": {
                      "value": {"type": "string"},
                      "type": {"type": "string"}
                   },
                   "required": [
                      "value",
                      "type"
                   ]
                },
                "EventDesc": {
                   "type": "array",
                   "items": {
                      "type": "object",
                      "properties": {
                         "value": {"type": "string"},
                         "lang": {"type": "string"}
                      },
                      "required": [
                         "value",
                         "lang"
                      ]
                   },
                   "minItems": 0
                },
```

From FIG. 7A

```
            "Location": {
               "type": "array",
               "items": {
                  "type": "object",
                  "properties": { "value": {"type": "string"}, "type": {"type": "string"}       },
                  "required": [ "value",  "type"   ]
               },
               "minItems": 1
            }
         },
         "required": [
            "effective",
            "expires",
            "EventCode",
            "Location"
         ]
      },
      "AEAtext": {
         "type": "array",
         "items": {
            "type": "object",
            "properties": { "value": {"type": "string"}, "lang": {"type": "string"} },
            "required": [ "value",   "lang" ]
         },
         "minItems": 1
      },
"LiveMedia": {
         "type": "object",
         "properties": {
            "bsid": {"type": "integer"},
            "serviceId": {"type": "interger"},
            "ServiceName": {
               "type": "array",
               "items": {
                  "type": "object",
                  "properties": {
                     "name": {"type": "string"},
                     "lang": {"type": "string"}
                  },
                  "required": [
                     "name",
                     "lang"
                  ]
               },
               "minItems": 0
            }
         },
         "required": [
            "bsid",
            "serviceId"
         ]
      },
```

From FIG. 7B

```
            "Media": {
          "type": "array",
          "items": {
            "type": "object",
            "properties": {
              "lang": {"type": "string"},
              "mediaDesc": {"type": "string"},
              "uri": {
                "type": "string",
                "format": "uri"
              },
              "contentType": {"type": "string"},
              "contentLength": {"type": "integer"}
            },
            "required": ["uri"]
          },
          "minItems": 0
        },
        "Signature": {"type": "object"}
      },
      "required": [
        "AEAid",
        "issuer",
        "audience",
        "AEAtype",
        "Header",
        "AEAtext"
      ]
    },
    "minItems": 1,
    "maxItems": 1
  }},
  "required": ["AEA"],
  "additionalProperties": true
 },
 "required": ["AEAT"]
}
```

FIG. 7C

SYSTEMS AND METHODS FOR SIGNALING OF EMERGENCY ALERT MESSAGES

CROSS REFERENCE

This Nonprovisional application claims priority under 35 U.S.C. § 119 on provisional Application No. 62/374,698 on Aug. 12, 2016, and provisional Application No. 62/400,593 on Sep. 27, 2016, the entire contents of which are hereby incorporated by reference.

TECHNICAL FIELD

The present disclosure relates to the field of interactive television.

BACKGROUND ART

Digital media playback capabilities may be incorporated into a wide range of devices, including digital televisions, including so-called "smart" televisions, set-top boxes, laptop or desktop computers, tablet computers, digital recording devices, digital media players, video gaming devices, cellular telephones, including so-called "smart" phones, dedicated video streaming devices, and the like. Digital media content (e.g., video and audio programming) may originate from a plurality of sources including, for example, over-the-air television providers, satellite television providers, cable television providers, online media service providers, including, so-called streaming service providers, and the like. Digital media content may be delivered over packet-switched networks, including bidirectional networks, such as Internet Protocol (IP) networks and unidirectional networks, such as digital broadcast networks.

Digital media content may be transmitted from a source to a receiver device (e.g., a digital television or a smart phone) according to a transmission standard. Examples of transmission standards include Digital Video Broadcasting (DVB) standards, Integrated Services Digital Broadcasting Standards (ISDB) standards, and standards developed by the Advanced Television Systems Committee (ATSC), including, for example, the ATSC 2.0 standard. The ATSC is currently developing the so-called ATSC 3.0 suite of standards. The ATSC 3.0 suite of standards seek to support a wide range of diverse services through diverse delivery mechanisms. For example, the ATSC 3.0 suite of standards seeks to support broadcast multimedia delivery, so-called broadcast streaming and/or file download multimedia delivery, so-called broadband streaming and/or file download multimedia delivery, and combinations thereof (i.e., "hybrid services"). An example of a hybrid service contemplated for the ATSC 3.0 suite of standards includes a receiver device receiving an over-the-air video broadcast (e.g., through a unidirectional transport) and receiving a synchronized secondary audio presentation (e.g., a secondary language) from an online media service provider through a packet switched network (i.e., through a bidirectional transport). In addition to defining how digital media content may be transmitted from a source to a receiver device, transmission standards may specify how emergency alert messages may be communicated from a source to a receiver device. Current techniques for communicating emergency alert messages may be less than ideal.

SUMMARY OF INVENTION

In general, this disclosure describes techniques for signaling (or signalling) emergency alert messages. In particular, the techniques described herein may be used for signaling information associated with content included in an emergency alert message, and/or other information associated with an emergency alert message. In some cases, a receiver device may be able to parse information associated with emergency alert messages and cause the presentation and/or rendering of digital media content to be modified, such that the corresponding emergency message alert is more apparent to a user. For example, a receiver device may be configured to close or temporarily suspend an application, if signaling information indicates the presence of a particular type of content is included in an emergency alert message. It should be noted that although the techniques described herein, in some examples, are described with respect to emergency alert messages, the techniques described herein may be more generally applicable to other types of alerts and messages. It should be noted that although in some examples the techniques of this disclosure are described with respect to ATSC standards, the techniques described herein are generally applicable to any transmission standard. For example, the techniques described herein are generally applicable to any of DVB standards, ISDB standards, ATSC Standards, Digital Terrestrial Multimedia Broadcast (DTMB) standards, Digital Multimedia Broadcast (DMB) standards, Hybrid Broadcast and Broadband Television (HbbTV) standards, World Wide Web Consortium (W3C) standards, Universal Plug and Play (UPnP) standards, and other video encoding standards. Further, it should be noted that incorporation by reference of documents herein is for descriptive purposes and should not be constructed to limit and/or create ambiguity with respect to terms used herein. For example, in the case where one incorporated reference provides a different definition of a term than another incorporated reference and/or as the term is used herein, the term should be interpreted in a manner that broadly includes each respective definition and/or in a manner that includes each of the particular definitions in the alternative.

An aspect of the invention is a method for signaling information associated with an emergency alert message, the method comprising: signaling a syntax element indicating a content type of a media resource associated with an emergency alert message; and signaling a syntax element providing a description of the media resource.

An aspect of the invention is a method for retrieving a media resource associated with an emergency alert, the method comprising: receiving an emergency alert message from a service provider; parsing a syntax element indicating a content type of a media resource associated with an emergency alert message; and determining based at least in part on the syntax element indicating the content type whether to retrieve the media resource.

A method for signaling information associated with an emergency alert message from a primary device to a companion device, the method comprising: signaling one or more syntax elements indicating information associated with an emergency; and signaling a syntax element indicating a service identifier identifying an audio visual service providing information related to the emergency.

BRIEF DESCRIPTION OF DRAWINGS

FIG. 1 is a conceptual diagram illustrating an example of content delivery protocol model according to one or more techniques of this disclosure.

FIG. 6A is a computer program listing illustrating an example schema of an example emergency alert message.

FIG. 6B is the next part of FIG. 6A

FIG. 7A is a computer program listing illustrating an example schema of an example emergency alert message.

FIG. 7B is the next part of FIG. 7A

FIG. 7C is the next part of FIG. 7B

DESCRIPTION OF EMBODIMENTS

Figure 2:
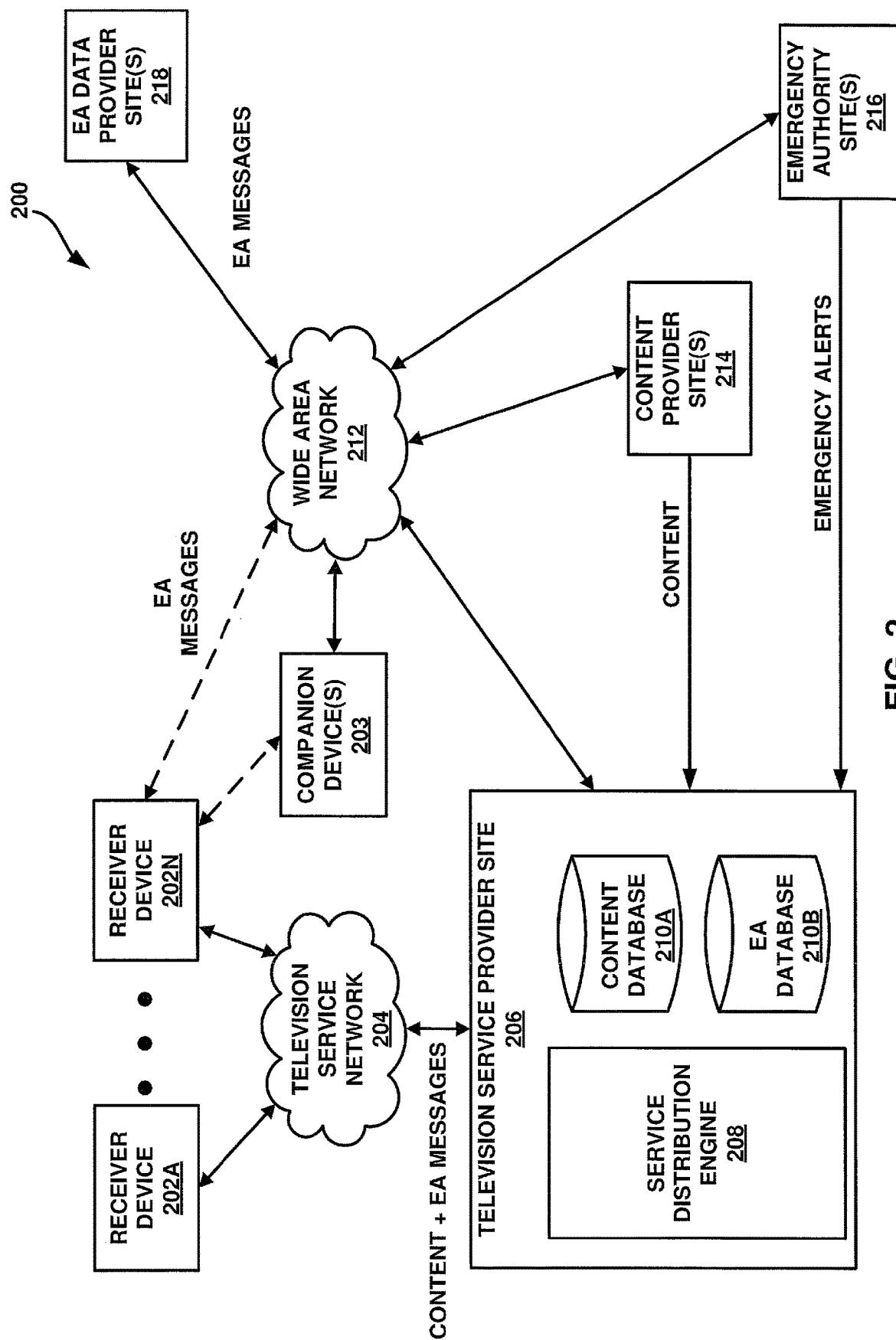
FIG. 2 is a block diagram illustrating an example of a system that may implement one or more techniques of this disclosure.

Transmission standards may define how emergency alerts may be communicated from a service provider to receiver devices. Emergency alerts are typically generated by an emergency authority and transmitted to a service provider. An emergency authority may be included as part of a government agency. For example, emergency authorities may include the United States National Weather Service, the United States Department of Homeland Security, local and regional agencies (e.g., police and fire departments) and the like. Emergency alerts may include information about a current or anticipated emergency. Information may include information that is intended to further the protection of life, health, safety, and property, and may include critical details regarding the emergency and how to respond to the emergency. Examples of the types of emergencies that may be associated with an emergency alert include tornadoes, hurricanes, floods, tidal waves, earthquakes, icing conditions, heavy snow, widespread fires, discharge of toxic gases, widespread power failures, industrial explosions, civil disorders, warnings and watches of impending changes in weather, and the like.

A service provider, such as, for example, a television broadcaster (e.g., a regional network affiliate), a multi-channel video program distributor (MVPD) (e.g., a cable television service operator, a satellite television service operator, an Internet Protocol Television (IPTV) service operator), and the like, may generate one or more emergency alert messages for distribution to receiver devices. Emergency alerts and/or emergency alert messages may include one or more of text (e.g., "Severe Weather Alert"), images (e.g., a weather map), audio content (e.g., warning tones, audio messages, etc.), video content, and/or electronic documents. Emergency alert messages may be integrated into the presentation of a multimedia content using various techniques. For example, an emergency alert message may be "burned-in" to video as a scrolling banner or mixed with an audio track or an emergency alert message may be presented in an overlaid user controllable window (e.g., a pop-up window). Further, in some examples, emergency alerts and/or emergency alert messages may include Uniform Resource Identifiers (URIs). For example, an emergency alert message may include Universal Resource Locators (URLs) that identify where additional information (e.g., video, audio, text, images, etc.) related to the emergency may be obtained (e.g., the IP address of a server including a document describing the emergency). A receiver device receiving an emergency alert message including a URL (either through a unidirectional broadcast or through a bidirectional broadband connection) may obtain a document describing an emergency alert, parse the document, and display information included in the document on a display (e.g., generate and overlay a scrolling banner on video presentation, render images, play audio messages). Protocols may specify one or more schemas for formatting an emergency alert message, such as, for example, schemas based on Hypertext Markup Language (HTML), Dynamic HTML, Extensible Markup Language (XML), JavaScript Object Notation (JSON), and Cascading Style Sheets (CSS). Common Alerting Protocol, Version 1.2, which is described in OASIS: "Common Alerting Protocol" Version 1.2, 1 Jul. 2010, (hereinafter "CAP Version 1.2") provides an example of how an emergency alert message may be formatted according to a XML schema. Further, ANSI: "Emergency Alert Messaging for Cable," J-STD-42-B, American National Standards Association, October 2013 provides an example of how an emergency alert message may be formatted according to a schema.

Computing devices and/or transmission systems may be based on models including one or more abstraction layers, where data at each abstraction layer is represented according to particular structures, e.g., packet structures, modulation schemes, etc. An example of a model including defined abstraction layers is the so-called Open Systems Interconnection (OSI) model illustrated in FIG. 1. The OSI model defines a 7-layer stack model, including an application layer, a presentation layer, a session layer, a transport layer, a network layer, a data link layer, and a physical layer. It should be noted that the use of the terms upper and lower with respect to describing the layers in a stack model may be based on the application layer being the uppermost layer and the physical layer being the lowermost layer. Further, in some cases, the term "Layer 1" or "L1" may be used to refer to a physical layer, the term "Layer 2" or "L2" may be used to refer to a link layer, and the term "Layer 3" or "L3" or "IP layer" may be used to refer to the network layer.

A physical layer may generally refer to a layer at which electrical signals form digital data. For example, a physical layer may refer to a layer that defines how modulated radio frequency (RF) symbols form a frame of digital data. A data link layer, which may also be referred to as link layer, may refer to an abstraction used prior to physical layer processing at a sending side and after physical layer reception at a receiving side. As used herein, a link layer may refer to an abstraction used to transport data from a network layer to a physical layer at a sending side and used to transport data from a physical layer to a network layer at a receiving side. It should be noted that a sending side and a receiving side are logical roles and a single device may operate as both a sending side in one instance and as a receiving side in another instance. A link layer may abstract various types of data (e.g., video, audio, or application files) encapsulated in particular packet types (e.g., Motion Picture Expert Group—Transport Stream (MPEG-TS) packets, Internet Protocol Version 4 (IPv4) packets, etc.) into a single generic format for processing by a physical layer. A network layer may generally refer to a layer at which logical addressing occurs. That is, a network layer may generally provide addressing information (e.g., Internet Protocol (IP) addresses, URLs, URIs, etc.) such that data packets can be delivered to a particular node (e.g., a computing device) within a network. As used herein, the term network layer may refer to a layer above a link layer and/or a layer having data in a structure such that it may be received for link layer processing. Each of a transport layer, a session layer, a presentation layer, and an application layer may define how data is delivered for use by a user application.

Transmission standards, including transmission standards currently under development, may include a content delivery protocol model specifying supported protocols for each layer and may further define one or more specific layer implementations. Referring again to FIG. 1, an example content delivery protocol model is illustrated. In the example illustrated in FIG. 1, content delivery protocol model 100 is generally aligned with the 7-layer OSI model for illustration purposes. It should be noted that such an illustration should not be construed to limit implementations of the content delivery protocol model 100 and/or the techniques described herein. Content delivery protocol model 100 may generally correspond to the currently proposed content delivery protocol model for the ATSC 3.0 suite of standards. Further, the techniques described herein may be implemented in a system configured to operate based on content delivery protocol model 100.

The ATSC 3.0 suite of standards includes ATSC Standard A/321, System Discovery and Signaling Doc. A/321:2016, 23 Mar. 2016 (hereinafter "A/321"), which is incorporated by reference herein in its entirety. A/321 describes the initial entry point of a physical layer waveform of an ATSC 3.0 unidirectional physical layer implementation. Further, aspects of the ATSC 3.0 suite of standards currently under development are described in Candidate Standards, revisions thereto, and Working Drafts (WD), each of which may include proposed aspects for inclusion in a published (i.e., "final" or "adopted") version of an ATSC 3.0 standard. For example, ATSC Standard: Physical Layer Protocol, Doc. 532-230r56, 29 Jun. 2016, which is incorporated by reference herein in its entirety, describes a proposed unidirectional physical layer for ATSC 3.0. The proposed ATSC 3.0 unidirectional physical layer includes a physical layer frame structure including a defined bootstrap, preamble, and data payload structure including one or more physical layer pipes (PLPs). A PLP may generally refer to a logical structure within an RF channel or a portion of an RF channel. The proposed ATSC 3.0 suite of standards refers to the abstraction for an RF Channel as a Broadcast Stream. The proposed ATSC 3.0 suite of standards further provides that a PLP is identified by a PLP identifier (PLPID), which is unique within the Broadcast Stream it belongs to. That is, a PLP may include a portion of an RF channel (e.g., a RF channel identified by a geographic area and frequency) having particular modulation and coding parameters.

The proposed ATSC 3.0 unidirectional physical layer provides that a single RF channel can contain one or more PLPs and each PLP may carry one or more services. In one example, multiple PLPs may carry a single service. In the proposed ATSC 3.0 suite of standards, the term service may be used to refer to a collection of media components presented to the user in aggregate (e.g., a video component, an audio component, and a sub-title component), where components may be of multiple media types, where a service can be either continuous or intermittent, where a service can be a real time service (e.g., multimedia presentation corresponding to a live event) or a non-real time service (e.g., a video on demand service, an electronic service guide service), and where a real time service may include a sequence of television programs. Services may include application based features. Application based features may include service components including an application, optional files to be used by the application, and optional notifications directing the application to take particular actions at particular times. In one example, an application may be a collection of documents constituting an enhanced or interactive service. The documents of an application may include HTML, JavaScript, CSS, XML, and/or multimedia files. It should be noted that the proposed ATSC 3.0 suite of standards specifies that new types of services may be defined in future versions. Thus, as used herein the term service may refer to a service described with respect to the proposed ATSC 3.0 suite of standards and/or other types of digital media services. As described above, a service provider may receive an emergency alert from an emergency authority and generate emergency alert messages that may be distributed to receiver devices in conjunction with a service. A service provider may generate an emergency alert message that is integrated into a multimedia presentation and/or generate an emergency alert message as part of an application based enhancement. For example, emergency information may be displayed in video as text (which may be referred to as emergency on-screen text information), and may include, for example, a scrolling banner (which may be referred to as a crawl). The scrolling banner may be received by the receiver device as a text message burned-in to a video presentation (e.g., as an onscreen emergency alert message) and/or as text included in a document (e.g., an XML fragment).

Referring to FIG. 1, content delivery protocol model 100 supports streaming and/or file download through the ATSC Broadcast Physical layer using MPEG Media Transport Protocol (MMTP) over User Datagram Protocol (UDP) and Internet Protocol (IP) and Real-time Object delivery over Unidirectional Transport (ROUTE) over UDP and IP. MMTP is described in ISO/IEC: ISO/IEC 23008-1, "Information technologyHigh efficiency coding and media delivery in heterogeneous environments-Part 1: MPEG media transport (MMT)." An overview of ROUTE is provided in ATSC Candidate Standard: Signaling, Delivery, Synchronization, and Error Protection (A/331) Doc. 533-601r4, 21 Jun. 2016, Rev. 3 20 Jul. 2016 (hereinafter "A/331"), which is incorporated by reference in its entirety. It should be noted that although ATSC 3.0 uses the term broadcast in some contexts to refer to a unidirectional over-the-air transmission physical layer, the so-called ATSC 3.0 broadcast physical layer supports video delivery through streaming or file download. As such, the term broadcast as used herein should not be used to limit the manner in which video and associated data may be transported according to one or more techniques of this disclosure. Further, content delivery protocol model 100 supports signaling at the ATSC Broadcast Physical Layer (e.g., signaling using the physical frame preamble), signaling at the ATSC Link-Layer (signaling using a Link Mapping Table (LMT)), signaling at the IP layer (e.g., so-called Low Level Signaling (LLS)), service layer signaling (SLS) (e.g., signaling using messages in MMTP or ROUTE), and application or presentation layer signaling (e.g., signaling using a video or audio watermark).

As described above, the proposed ATSC 3.0 suite of standards supports signaling at the IP layer, which is referred to as Low Level Signaling (LLS). In the proposed ATSC 3.0 suite of standards, LLS includes signaling information which is carried in the payload of IP packets having an address and/or port dedicated to this signaling function. The proposed ATSC 3.0 suite of standards defines five types of LLS information that may be signaled in the form of a LLS Table: a Service List Table (SLT), Rating Region Table (RRT), a System Time fragment, an Advanced Emergency Alerting Table fragment (AEAT) message, and an Onscreen Message Notification. Additional LLS Tables may be signaled in future versions. Table 1 provides the syntax provided for an LLS table, as defined according to the proposed ATSC 3.0 suite of standards and described in A/331. In Table 1, and other tables described herein, uimsbf refers to an unsigned integer most significant bit first data format and var refers to a variable number of bits.

TABLE 1

| Syntax | No. of Bits | Format |
|---|---|---|
| LLS_table( ) { | | |
|   LLS_table_id | 8 | uimsbf |
|   provider_id | 8 | uimsbf |
|   LLS_table_version | 8 | uimsbf |
|   switch (LLS_table_id) { | | |
|     case 0x01: | | |
|       SLT | var | Sec. 6.3 of A/331 |
|       break; | | |
|     case 0x02: | | |
|       RRT | var | Annex F of A/331 |
|       break; | | |
|     case 0x03: | | |
|       SystemTime | var | Sec. 6.4 of A/331 |
|       break; | | |
|     case 0x04: | | |
|       AEAT | var | Sec. 6.5 of A/331 or alternatives described below |
|       break; | | |
|     case 0x05: | | |
|       OnscreenMessageNotification | var | Sec. 6.6 of A/331 |
|       break; | | |
|     default: | | |
|       reserved | var | |
|   } | | |
| } | | |

A/331 provides the following definitions for syntax elements included in Table 1:

LLS_table_id—An 8-bit unsigned integer that shall identify the type of table delivered in the body. Values of LLS_table_id in the range 0 to 0x7F shall be defined by or reserved for future use by ATSC. Values of LLS_table_id in the range 0x80 to 0xFF shall be available for user private usage.

provider_id—An 8-bit unsigned integer that shall identify the provider that is associated with the services signaled in this instance of LLS_table( ) where a "provider" is a broadcaster that is using part or all of this broadcast stream to broadcast services. The provider_id shall be unique within this broadcast stream.

LLS_table_version—An 8-bit unsigned integer that shall be incremented by 1 whenever any data in the table identified by a combination of LLS_table_id and provider_id changes. When the value reaches 0xFF, the value shall wrap to 0x00 upon incrementing. Whenever there is more than one provider sharing a broadcast stream, the LLS_table( ) should be identified by a combination of LLS_table_id and provider_id.

SLT—The XML format Service List Table (Section 6.3 [of A/331]), compressed with gzip [i.e., the gzip file format].

RRT—An instance of a Rating Region Table conforming to the RatingRegionTable structure specified in Annex F [of A/331], compressed with gzip.

SystemTime—The XML format System Time fragment (Section 6.3 [of A/331]), compressed with gzip.

AEAT—The XML format Advanced Emergency Alerting Table fragment conforming to the Advanced Emergency Alerting Message Format (AEA-MF) structure (Section 6.5 [of A/331]) compressed with gzip.

As described above, a service provider may receive an emergency alert from an emergency authority and generate emergency alert messages that may be distributed to receiver devices in conjunction with a service. The AEAT fragment is an example of a document that may include an emergency alert message. In A/331, the AEAT fragment may be composed of one or more AEA (Advanced Emergency Alerting) messages, where the AEA message is formatted according to a AEA-MF (Advanced Emergency Alerting-Message Format) structure. In A/331, the AEA-MF includes facilities for multimedia content that may be forwarded from the alert originator (e.g., an emergency authority) or a service provider to a receiver device. Table 2 describes the structure of the AEAT element as provided in A/331. It should be noted that in Table 2, and other tables included herein, data types string, unsignedByte, dateTime, language, and anyURI, may correspond to definitions provided in XML Schema Definition (XSD) recommendations maintained by the World Wide Web Consortium (W3C). In one example, these may correspond to definitions described in "XML Schema Part 2: Datatypes Second Edition." Further, Use may correspond to cardinality of an element or attribute (i.e., the number of occurrences of an element or attribute).

TABLE 2

| Element or Attribute Name | Use | Data Type | Short Description |
|---|---|---|---|
| AEAT | | | Root element of the AEAT |
|   AEA | 1 . . . N | | Advanced Emergency Alert formatted as AEA-MF. |
|     @AEAid | 1 | String | The identifier of AEA message. |
|     @issuer | 1 | String | The identifier of the broadcast station originating or forwarding the message. |
|     @audience | 1 | String | The intended distribution of the AEA message. |
|     @AEAtype | 1 | String | The category of the message. |
|     @refAEAid | 0 . . . 1 | String | The referenced identifier of AEA message. It shall appear when the @AEAtype is "update" or "cancel". |
|     @priority | 1 | unsignedByte | The priority of the message |
|     Header | 1 | | The container for the basic alert envelope. |
|       @effective | 1 | dateTime | The effective time of the alert message. |
|       @expires | 1 | dateTime | The expiration time of the alert message. |
|       EventCode | 1 | String | A code identifying the event type of the AEA message. |
|         @type | 1 | String | A national-assigned string designating the domain of the code (e.g. SAME in US, . . . ) |
|       Location | 1 . . . N | String | The geographic code delineating the affected area of the alert message |

TABLE 2-continued

| Element or Attribute Name | Use | Data Type | Short Description |
|---|---|---|---|
| @type | 1 | String | A national-assigned string designating the domain of the code (e.g. "FIPS" in US, or "SGC" in Canada . . . ) |
| AEAtext | 1 . . . N | String | Contains the specific text of the emergency notification |
| @lang | 1 | language | The code denoting the language of the respective element of the alert text |
| Media | 0 . . . N | | Contains the component parts of the multimedia resource. |
| @lang | 0 . . . 1 | language | The code denoting the language of the respective element Media |
| @mediaDesc | 0 . . . 1 | String | Text describing the type and content of the media file |
| @uri | 1 | anyURI | The identifier of the media file |
| Signature | 0 . . . 1 | Any | |

In one example, the elements and attributes included in Table 2 may be based on the following semantics which are included in A/331:

AEAT—Root element of the AEAT.

AEA—Advanced Emergency Alerting Message. This element is the parent element that has @AEAid, @issuer, @audience, @AEAtype, @refAEAid, and @priority attributes plus the following child-elements: Header, AEAtext, Media, and optionally Signature.

AEA@AEAid—This element shall be a string value uniquely identifying the AEA message, assigned by the station (sender). The @AEAid shall not include spaces, commas or restricted characters (< and &).

AEA@issuer—A string that shall identify the broadcast station originating or forwarding the message. @issuer shall include an alphanumeric value, such as call letters, station identifier (ID), group name, or other identifying value.

AEA@audience—A string that shall identify the intended audience for the message. The value shall be coded according to Table 3.

TABLE 3

| Audience | Meaning |
|---|---|
| "public" | For general dissemination to unrestricted audiences. All alerts intended for public consumption must have the value of "public." (required for AEA-MF public dissemination) |
| "restricted" | For dissemination only to an audience with a defined operational requirement. Alerts intended for non-public dissemination may include the value of "restricted". |
| "private" | For dissemination only to specified addresses (conditional access requirement). |
| other values | Reserved for future use |

AEA@refAEAid—A string that shall identify the AEAid of a referenced AEA message. It shall appear when the @AEAtype is "update" or "cancel".

AEA@AEAtype—A string that shall identify the category of the AEA message. The value shall be coded according to Table 4. @refAEAid

TABLE 4

| AEA_type | Meaning |
|---|---|
| "alert" | Indicates that AEA message is new. (Note, alert messages such as the U.S. required monthly test, "RMT", are considered alert messages, and must contain the value of "alert"). In this case, @refAEAid shall not appear. |

TABLE 4-continued

| AEA_type | Meaning |
|---|---|
| "update" | Indicates that AEA message is not new, but contains updated information from any previous emergency alert message. In this case, @refAEAid shall appear. |
| "cancel" | Indicates that AEA message is cancelling any previous emergency alert message, even when the message isn't expired. In this case, @refAEAid shall appear. |
| other values | Reserved for future use. |

AEA@priority—The AEA message shall include an integer value that indicates the priority of the alert. The value shall be coded according to Table 5.

TABLE 5

| Priority | Meaning |
|---|---|
| 4 | Maximum Priority Urgent or extreme message context A highest level of alert (e.g. the U.S. Emergency Action Notification/EAN) A Canadian "broadcast immediate" requirement in the source alert message. Defined by station operator a time critical alert (e.g. earthquake/EQW or tornado/TOR) |
| 3 | High Priority Defined by station operator for messages of an important or severe context. May also be used for a "broadcast immediate" message. Overrides any previous messages. |
| 2 | Moderate Priority Defined by station operator for messages of a moderate but actionable priority |
| 1 | Low Priority Defined by station operator for messages of an informative nature, or of minor and non-actionable status (e.g. weather watches). |
| 0 | Minor Priority Defined by station operator for periodic or occasional messages of extremely minor context (e.g. test or administrative signals). Messages should not interrupt the user from other interactive functions. |
| other values | Reserved for future use |

Header—This element shall contain the relevant envelope information for the alert, including the type of alert (Event- Code), the time the alert is effective (@effective), the time it expires (@expires), and the location of the targeted alert area (Location).

Header@effective—This dateTime shall contain the effective time of the alert message. The date and time shall be represented in the XML dateTime data type format (e.g., "2016-06-23T22:11:16-05:00" for 23 Jun. 2016 at 11:15 am EDT). Alphabetic time zone designators such as "Z" shall not be used. The time zone for UTC shall be represented as "-00:00".

Header@expires—This dateTime shall contain the expiration time of the alert message. The date and time shall be represented in the XML dateTime data type format (e.g., "2016-06-23T22:11:16-05:00" for 23 Jun. 2016 at 11:15 am EDT). Alphabetic time zone designators such as "Z" shall not be used. The time zone for UTC shall be represented as "-00:00".

EventCode—A string that shall identify the event type of the alert message formatted as a string (which may represent a number) denoting the value itself (e.g., in the U.S., a value of "EVI" would be used to denote an evacuation warning). Values may differ from nation to nation, and may be an alphanumeric code, or may be plain text. Only one EventCode shall be present per AEA message.

EventCode@type—This attribute shall be a national-assigned string value that shall designate the domain of the EventCode (e.g., in the U.S., "SAME" denotes standard Federal Communications Commission (FCC) Part 11 Emergency Alert System (EAS) coding). Values of @type that are acronyms should be represented in all capital letters without periods.

Location—A string that shall describe a message target with a geographically-based code.

Location@type—This attribute shall be string that identifies the domain of the Location code.

If @type="FIPS", then the Location shall be defined as the Federal Information Processing Standard (FIPS) geographic codes as specified by the U.S. Federal Communications Commission in 47 Code of Federal Regulations (CFR) 11 (as amended) for the Emergency Alert System.

If @type="SGC", then the Location shall be defined as the Standard Geographic Classification codes as defined by Statistics Canada, version 2006, updated May 2010.

If @type="polygon", then the Location shall define a geospatial space area consisting of a connected sequence of four or more coordinate pairs that form a closed, nonself-intersecting loop.

If @type="circle", then the Location shall define a circular area is represented by a central point given as a coordinate pair followed by a space character and a radius value in kilometers.

Textual values of @type are case sensitive, and shall be represented in all capital letters, with the exceptions of "polygon" and "circle".

AEAtext—A string of the plain text of the emergency message. Each AEAtext element shall include exactly one @lang attribute. For AEAtext of the same alert in multiple languages, this element shall require the presence of multiple AEAtext elements.

AEAtext@lang—This attribute shall identify the language of the respective AEAtext element of the alert message. This attribute shall represent the language for the name of this ATSC 3.0 service, and which shall be represented by BCP 47 formal natural language identifiers as defined by BCP 47 [Internet Engineering Task Force (IETF) Best Current Practice (BCP) 47. It should be noted that BCP is a persistent name for a series of IETF RFCs (Request for Comments) whose numbers change as they are updated. The latest RFC describing language tag syntax is RFC 5646, Tags for the Identification of Languages, which is incorporated by reference herein, and it obsoletes the older RFCs 4646, 3066 and 17661. There shall be no implicit default value.

Media—Shall contain the component parts of the multimedia resource, including the language (@lang), description (@mediaDesc) and location (@url) of the resource. Refers to an additional file with supplemental information related to the AEAtext; e.g., an image or audio file. Multiple instances may occur within an AEA message block.

Media@lang—This attribute shall identify the respective language for each Media resource, to help instruct the recipient if different language instances of the same multimedia are being sent. This attribute shall represent the language for the name of this ATSC 3.0 service, and which shall be represented by formal natural language identifiers as defined by BCP 47.

Media@mediaDesc—A string that shall, in plain text, describe the type and content of the Media resource. The description should indicate the media type, such as video, photo, PDF, etc.

Media@uri—An optional element that shall include a full URL that can be used to retrieve the resource from an destination external from the message. When a rich media resource is delivered via broadband, the URL of the Media element shall be reference a file on a remote server. When a rich media resource is delivered via broadcast ROUTE, the URL for the resource shall begin with http://localhost/. The URL shall match the Content-Location attribute of the corresponding File element in the Extended File Delivery Table (EFDT) in the LCT [IETF: RFC 5651, "Layered Coding Transport (LCT) Building Block," Internet Engineering Task Force, Reston, Va., October, 2009] channel delivering the file, or the Entity header of the file."

Signature—An optional element that shall enable digitally signed messages between the station and the receiver.

As illustrated in Table 2, an AEA message may include may include a URI (Media@uri) that identifies where additional media resources (e.g., video, audio, text, images, etc.) related to the emergency may be obtained. The AEA message may include information associated with the additional media resources. The signaling of information associated with the additional media resource, as provided in Table 2, may be less than ideal.

As described above, the proposed ATSC 3.0 suite of standards supports signaling using a video or audio watermark. A watermark may be useful to ensure that a receiver device can retrieve supplementary content (e.g., emergency messages, alternative audio tracks, application data, closed captioning data, etc.) regardless of how multimedia content is distributed. For example, a local network affiliate may embed a watermark in a video signal to ensure that a receiver device can retrieve supplemental information associated with a local television presentation and thus, present supplemental content to a viewer. For example, content provider may wish to ensure that the message appears with the presentation of a media service during a redistribution scenario. An example of a redistribution scenario may include a situation where an ATSC 3.0 receiver device receives a multimedia signal (e.g., a video and/or audio signal) and recovers embedded information from the multimedia signal. For example, a receiver device (e.g., a digital television) may receive an uncompressed video signal from a multimedia interface (e.g., a High Definition Multimedia Interface (HDMI), or the like) and the receiver device may recover embedded information from the uncompressed video signal. In some cases, a redistribution scenario may occur when a MVPD acts as an intermediary between a receiver device and a content provider (e.g., a local network affiliate). In these cases, a set-top box may receive a multimedia service data stream through particular physical, link, and/or network layers formats and output an uncompressed multimedia signal to a receiver device. It should be noted that in some examples, a redistribution scenario may include a situation where set-top box or a home media server acts as in-home video distributor and serves (e.g., through a local wired or wireless network) to connected devices (e.g., smartphones, tablets, etc.). Further, it should be noted that in some cases, an MVPD may embed a watermark in a video signal to enhance content originating from a content provider (e.g., provide a targeted supplemental advertisement).

ATSC Candidate Standard: Content Recovery (A/336), Doc. 533-178r2, 15 Jan. 2016 (hereinafter "A/336"), which is incorporated by reference in its entirety, specifies how certain signaling information can be carried in audio watermark payloads, video watermark payloads, and the user areas of audio tracks, and how this information can be used to access supplementary content in a redistribution scenario. A/336 describes where a video watermark payload may include emergency_alert_message( ). An emergency_alert_message( ) supports delivery of emergency alert information in video watermarks. Proposals have been made to either replace the emergency_alert_message( ) as provided in A/336 with an advanced_emergency_alert_message( ) provided in Table 6 or to add an advanced_emergency_alert_message( ) provided in Table 6 in addition to the emergency_alert_message( ) as provided in A/336. In Table 6, and other tables described herein, char refers to a character.

TABLE 6

| Syntax | No. of Bits | Format |
|---|---|---|
| advanced_emergency_alert_message( ) { | | |
|     AEA_ID_length (N1) | 8 | uimsbf |
|     AEA_ID | 8 * (N1) | |
|     AEA_issuer_length (N2) | 8 | uimsbf |
|     AEA_issuer | 8 * (N2) | |
|     effective | 32 | uimsbf |
|     expires | 32 | uimsbf |
|     reserved | 1 | '1' |
|     event_code_type_length (N3) | 3 | uimsbf |
|     event_code_length (N4) | 4 | uimsbf |
|     event_code_type | 8 * (N3) | |
|     event_code | 8 * (N4) | |
|     audience | 3 | uimsbf |
|     AEA_type | 3 | uimsbf |
|     priority | 4 | uimsbf |
|     ref_AEA_ID_flag | 1 | bslbf |
|     reserved | 1 | '1' |
|     num_AEA_text | 2 | uimsbf |
|     num_location | 2 | uimsbf |
|     if(ref_AEA_ID_flag == 'true') | | |
|         ref_AEA_ID_length (N5) | 8 | uimsbf |
|         ref_AEA_ID | 8 * (N5) | |
|     } | | |
|     for(i=0; i<num_AEA_text; i++){ | | |
|         AEA_text_lang_code | 16 | 2*char |
|         AEA_text_length (N6) | 8 | uimsbf |
|         AEA_text | 8 * (N6) | |
|     } | | |
|     for(i=0; i<num_location; i++){ | | |
|         reserved | 5 | '11111' |
|         location_type | 3 | uimsbf |
|         location_length (N7) | 8 | uimsbf |
|         location | 8 * (N7) | |
|     } | | |
| } | | |

The following definitions have been provided for respective syntax elements AEA_ID_length (N1); AEA_ID; AEA_issuer_length (N2); AEA_issuer; effective; expires; event_code_type_length (N3); event_code_length (N4); event_code_type; event_code; audience; AEA_type; priority; ref_AEA_ID_flag; num_AEA_text; num_location; ref_AEA_ID_length (N5); ref_AEA_ID; AEA_text_lang_code; AEA_text_length (N6); AEA_text; location_type; location_length (N7); and location included in advanced_emergency_alert_message( ):

AEA_ID_length—This 8-bit unsigned integer field gives the length of the AEA_ID field in bytes.

AEA_ID—This string shall be the value of the AEAT.AEA@AEAid attribute of the current Advanced Emergency Alerting Message defined in [A/331].

AEA_issuer_length—This 8-bit unsigned integer field gives the length of the AEA_issuer field in bytes.

AEA_issuer—This string shall be the value of the AEAT.AEA@issuer attribute of the current Advanced Emergency Alerting Message defined in [A/331].

effective—This parameter shall indicate the effective date and time of AEA Message, encoded as a 32-bit count of the number of seconds since Jan. 1, 1970 00:00:00, International Atomic Time (TAI). This parameter shall be the value of the AEAT.AEA.Header@effective attribute of the current Advanced Emergency Alerting Message defined in [A/331].

expires—This parameter shall indicate the latest expiration date and time of AEA Message, encoded as a 32-bit count of the number of seconds since Jan. 1, 1970 00:00:00, International Atomic Time (TAI). This parameter shall be the value of the AEAT.AEA.Header@expires attribute of the current Advanced Emergency Alerting Message defined in [A/331].

audience—This 3-bit unsigned integer field gives the audience type of the message. This unsigned integer shall be the value of the AEAT.AEA@audience attribute of the current Advanced Emergency Alerting Message defined in [A/331]. The value shall be coded according to Table 7.

TABLE 7

| Code Value | audience [A/331] | Meaning |
|---|---|---|
| 0x00 | undefined | |
| 0x01 | "public" | For general dissemination to unrestricted audiences. All alerts intended for public consumption must have the value of "public." (required for AEA-MF public dissemination) |
| 0x02 | "restricted" | For dissemination only to an audience with a defined operational requirement. Alerts intended for non-public dissemination may include the value of "restricted". |
| 0x03 | "private" | For dissemination only to specified addresses (conditional access requirement). |
| 0x04-0x07 | other values | Reserved for future use | event_code_type_length—This 3-bit unsigned integer field gives the length of the event_code_type field in bytes.

event_code_length—This 4-bit unsigned integer field gives the length of the event_code field in bytes.

event_code_type—This string shall be the value of the AEAT.AEA.Header.EventCode@type attribute of the current Advanced Emergency Alerting Message defined in [A/331].

event_code—This string shall be the value of the AEA-T.AEA.Header.EventCode element of the current Advanced Emergency Alerting Message defined in [A/331].

AEA_type—This 3-bit unsigned integer field gives the category of the AEA message. This unsigned integer shall be the value of the AEAT.AEA@AEAtype attribute of the current Advanced Emergency Alerting Message defined in [A/331]. The value shall be coded according to Table 8.

TABLE 8

| Code Value | AEAtype | Meaning |
|---|---|---|
| 0x00 | undefined | |
| 0x01 | "alert" | Indicates that AEA message is new. (Note, alert messages such as the U.S. required monthly test, RMT, are considered alert messages, and must contain the value of "alert"). In this case, @ref_AEA_ID shall not appear. |
| 0x02 | "update" | Indicates that AEA message is not new, but contains updated information from any previous emergency alert message. In this case, @ref_AEA_ID shall appear. |
| 0x03 | "cancel" | Indicates that AEA message is cancelling any previous emergency alert message, even when the message isn't expired. In this case, @ref_AEA_ID shall appear. |
| 0x04-0x07 | other values | Reserved for future use | priority—This 4-bit unsigned integer shall be the value of the AEAT.AEA @priority attribute of the current Advanced Emergency Alerting Message defined in [A/331].

ref_AEA_ID_flag—This 1-bit Boolean flag field indicates the presence of the ref_AEA_ID field in the AEA message.

num_AEA_text—This 2-bit unsigned integer field gives the number of the AEA_text field in the AEA message.

num_location—This 2-bit unsigned integer field gives the number of the location field in the AEA message.

ref_AEA_ID_length—This 8-bit unsigned integer field gives the length of the ref_AEA_ID field in bytes.

ref_AEA_ID—This string shall be the value of the AEAT.AEA@refAEAid attribute of the current Advanced Emergency Alerting Message defined in [A/331].

AEA_text_lang_code—This 16-bit character field gives the language code of the AEA_text field. This string shall be the first two characters of the AEAT.AEA.AEAtext@lang attribute of the current Advanced Emergency Alerting Message defined in [A/331].

AEA_text_length—This 8-bit unsigned integer field gives the length of the AEA_text field in bytes.

AEA_text—This string shall be the value of the AEA-T.AEA.AEAtext element of the current Advanced Emergency Alerting Message defined in [A/331].

location_type—This 3-bit unsigned integer field gives the type of the location field. This unsigned integer shall be the value of the AEAT.AEA.Header.Location@type attribute of the current Advanced Emergency Alerting Message defined in [A/331] with the constraint that the "polygon" location_type shall not be used in the video watermark message. The value shall be coded according to Table 9.

TABLE 9

| Code Value | Location@type | Meaning |
|---|---|---|
| 0x00 | Undefined | |
| 0x01 | "FIPS" | The Federal Information Processing Standard (FIPS) geographic codes as specified by the U.S. Federal Communications Commission in 47 CFR 11 (as amended) for the Emergency Alert System. |
| 0x02 | "SGC" | The Standard Geographic Classification codes as defined by Statistics Canada, version 2006, updated May 2010. |
| 0x03 | "circle" | Circular area is represented by a central point given as a coordinate pair followed by a space character and a radius value in kilometers. |
| 0x04-0x07 | other values | Reserved for future use | location_length—This 8-bit unsigned integer field gives the length of the location field in bytes.

location—This string shall be the value of the AEA-T.AEA.Header.Location element of the current Advanced Emergency Alerting Message defined in [A/331].

As illustrated in Table 6, advanced_emergency_alert_message( ) may signal up to three AEA_text strings and up to three AEA location strings based on the respective 2-bit values of num_AEA_text and num_location ranging from 0 to 3. Further, as illustrated in Table 6, the language of AEA_text strings may be signaled using AEA_text_lang_code element. The signaling provided in Table 6, may be less than ideal. In this manner, the mechanisms proposed for signaling emergency alert messages in the ATSC 3.0 suite of standards may be less than ideal.

FIG. 2 is a block diagram illustrating an example of a system that may implement one or more techniques described in this disclosure. System 200 may be configured to communicate data in accordance with the techniques described herein. In the example illustrated in FIG. 2, system 200 includes one or more receiver devices 202A-202N, one or more companion device(s) 203, television service network 204, television service provider site 206, wide area network 212, one or more content provider site(s) 214, one or more emergency authority site(s) 216, and one or more emergency alert data provider site(s) 218. System 200 may include software modules. Software modules may be stored in a memory and executed by a processor. System 200 may include one or more processors and a plurality of internal and/or external memory devices. Examples of memory devices include file servers, file transfer protocol (FTP) servers, network attached storage (NAS) devices, local disk drives, or any other type of device or storage medium capable of storing data. Storage media may include Blu-ray discs, DVDs, CD-ROMs, magnetic disks, flash memory, or any other suitable digital storage media. When the techniques described herein are implemented partially in software, a device may store instructions for the software in a suitable, non-transitory computer-readable medium and execute the instructions in hardware using one or more processors.

System 200 represents an example of a system that may be configured to allow digital media content, such as, for example, a movie, a live sporting event, etc., and data, applications and media presentations associated therewith (e.g., emergency alert messages), to be distributed to and accessed by a plurality of computing devices, such as receiver devices 202A-202N. In the example illustrated in FIG. 2, receiver devices 202A-202N may include any device configured to receive data from television service provider site 206. For example, receiver devices 202A-202N may be equipped for wired and/or wireless communications and may be configured to receive services through one or more data channels and may include televisions, including so-called smart televisions, set top boxes, and digital video recorders. Further, receiver devices 202A-202N may include desktop, laptop, or tablet computers, gaming consoles, mobile devices, including, for example, "smart" phones, cellular telephones, and personal gaming devices configured to receive data from television service provider site 206. It should be noted that although system 200 is illustrated as having distinct sites, such an illustration is for descriptive purposes and does not limit system 200 to a particular physical architecture. Functions of system 200 and sites included therein may be realized using any combination of hardware, firmware and/or software implementations.

Television service network 204 is an example of a network configured to enable digital media content, which may include television services, to be distributed. For example, television service network 204 may include public over-the-air television networks, public or subscription-based satellite television service provider networks, and public or subscription-based cable television provider networks and/or over the top or Internet service providers. It should be noted that although in some examples television service network 204 may primarily be used to enable television services to be provided, television service network 204 may also enable other types of data and services to be provided according to any combination of the telecommunication protocols described herein. Further, it should be noted that in some examples, television service network 204 may enable two-way communications between television service provider site 206 and one or more of receiver devices 202A-202N. Television service network 204 may comprise any combination of wireless and/or wired communication media. Television service network 204 may include coaxial cables, fiber optic cables, twisted pair cables, wireless transmitters and receivers, routers, switches, repeaters, base stations, or any other equipment that may be useful to facilitate communications between various devices and sites. Television service network 204 may operate according to a combination of one or more telecommunication protocols. Telecommunications protocols may include proprietary aspects and/or may include standardized telecommunication protocols. Examples of standardized telecommunications protocols include DVB standards, ATSC standards, ISDB standards, DTMB standards, DMB standards, Data Over Cable Service Interface Specification (DOCSIS) standards, HbbTV standards, W3C standards, and UPnP standards.

Referring again to FIG. 2, television service provider site 206 may be configured to distribute television service via television service network 204. For example, television service provider site 206 may include one or more broadcast stations, an MVPD, such as, for example, a cable television provider, or a satellite television provider, or an Internet-based television provider. In the example illustrated in FIG. 2, television service provider site 206 includes service distribution engine 208, content database 210A, and emergency alert database 210B. Service distribution engine 208 may be configured to receive data, including, for example, multimedia content, interactive applications, and messages, including emergency alerts and/or emergency alert messages, and distribute data to receiver devices 202A-202N through television service network 204. For example, service distribution engine 208 may be configured to transmit television services according to aspects of the one or more of the transmission standards described above (e.g., an ATSC standard). In one example, service distribution engine 208 may be configured to receive data through one or more sources. For example, television service provider site 206 may be configured to receive a transmission including television programming from a regional or national broadcast network (e.g., NBC, ABC, etc.) through a satellite uplink and/or downlink or through a direct transmission. Further, as illustrated in FIG. 2, television service provider site 206 may be in communication with wide area network 212 and may be configured to receive multimedia content and data from content provider site(s) 214. It should be noted that in some examples, television service provider site 206 may include a television studio and content may originate therefrom.

Content database 210A and emergency alert database 210B may include storage devices configured to store data. For example, content database 210A may store multimedia content and data associated therewith, including for example, descriptive data and executable interactive applications. For example, a sporting event may be associated with an interactive application that provides statistical updates. Emergency alert database 210B may store data associated with emergency alerts, including, for example, emergency alert messages. Data may be formatted according to a defined data format, such as, for example, HTML, Dynamic HTML, XML, and JavaScript Object Notation (JSON), and may include URLs and URIs enabling receiver devices 202A-202N to access data, e.g., from one of emergency alert data provider site(s) 218. In some examples, television service provider site 206 may be configured to provide access to stored multimedia content and distribute multimedia content to one or more of receiver devices 202A-202N through television service network 204. For example, multimedia content (e.g., music, movies, and television (TV) shows) stored in content database 210A may be provided to a user via television service network 204 on a so-called on demand basis.

As illustrated in FIG. 2, in addition to being configured to receive data from television service provider site 206, a receiver device 202N may be configured to communicate with a companion device(s) 203. In the example illustrated in FIG. 2, companion device(s) 203 may be configured to communicate directly with a receiver device (e.g., using a short range communications protocol, e.g., Bluetooth), communicate with a receiver device via a local area network (e.g., through a Wi-Fi router), and/or communicate with a wide area network (e.g., a cellular network). As described in detail below, a companion device may be configured to receive data, including emergency alert information, for use by an application running thereon. Companion device(s) 203 may include a computing device configured to execute applications is conjunction with a receiver device. It should be noted that in the example illustrated in FIG. 2, although a single companion device is illustrated, each receiver device 202A-202N may be associated with a plurality of companion device(s). Companion device(s) 203 may be equipped for wired and/or wireless communications and may include devices, such as, for example, desktop, laptop, or tablet computers, mobile devices, smartphones, cellular telephones, and personal gaming devices. It should be noted that although not illustrated in FIG. 2, in some examples, companion device(s) may be configured to receive data from television service network 204.

Wide area network 212 may include a packet based network and operate according to a combination of one or more telecommunication protocols. Telecommunications protocols may include proprietary aspects and/or may include standardized telecommunication protocols. Examples of standardized telecommunications protocols include Global System Mobile Communications (GSM) standards, code division multiple access (CDMA) standards, 3rd Generation Partnership Project (3GPP) standards, European Telecommunications Standards Institute (ETSI) standards, European standards (EN), IP standards, Wireless Application Protocol (WAP) standards, and Institute of Electrical and Electronics Engineers (IEEE) standards, such as, for example, one or more of the IEEE 802 standards (e.g., Wi-Fi). Wide area network 212 may comprise any combination of wireless and/or wired communication media. Wide area network 212 may include coaxial cables, fiber optic cables, twisted pair cables, Ethernet cables, wireless transmitters and receivers, routers, switches, repeaters, base stations, or any other equipment that may be useful to facilitate communications between various devices and sites. In one example, wide area network 212 may include the Internet.

Referring again to FIG. 2, content provider site(s) 214 represent examples of sites that may provide multimedia content to television service provider site 206 and/or in some cases to receiver devices 202A-202N. For example, a content provider site may include a studio having one or more studio content servers configured to provide multimedia files and/or content feeds to television service provider site 206. In one example, content provider site(s) 214 may be configured to provide multimedia content using the IP suite. For example, a content provider site may be configured to provide multimedia content to a receiver device according to Real Time Streaming Protocol (RTSP), HyperText Transfer Protocol (HTTP), or the like.

Emergency authority site(s) 216 represent examples of sites that may provide emergency alerts to television service provider site 206. For example, as described above, emergency authorities may include the United States National Weather Service, the United States Department of Homeland Security, local and regional agencies, and the like. An emergency authority site may be a physical location of an emergency authority in communication (either directly or through wide area network 212) television service provider site 206. An emergency authority site may include one or more servers configured to provide emergency alerts to television service provider site 206. As described above, a service provider, e.g., television service provider site 206, may receive an emergency alert and generate an emergency alert message for distribution to a receiver device, e.g., receiver devices 202A-202N. It should be noted that in some cases an emergency alert and an emergency alert message may be similar. For example, television service provider site 206 may pass through an XML fragment received from emergency authority site(s) 216 to receiver devices 202A-202N as part of an emergency alert message. Television service provider site 206 may generate an emergency alert message according to a defined data format, such as, for example, HTML, Dynamic HTML, XML, and JSON.

As described above, an emergency alert message may include URIs that identify where additional content related to the emergency may be obtained. Emergency alert data provider site(s) 218 represent examples of sites configured to provide emergency alert data, including media content, hypertext based content, XML fragments, and the like, to one or more of receiver devices 202A-202N and/or, in some examples, television service provider site 206 through wide area network 212. Emergency alert data provider site(s) 218 may include one or more web servers.

As described above, service distribution engine 208 may be configured to receive data, including, for example, multimedia content, interactive applications, and messages, and distribute data to receiver devices 202A-202N through television service network 204. Thus, in one example scenario, television service provider site 206 may receive an emergency alert from emergency authority site(s) 216 (e.g., terrorist warning). Service distribution engine 208 may generate an emergency alert message (e.g., a message including "terrorist warning" text) based on the emergency alert, and cause the emergency message to distributed to receiver devices 202A-202N. For example, service distribution engine 208 may use LLS and/or watermarks, as described above, to communicate emergency alert messages.

Figure 3:
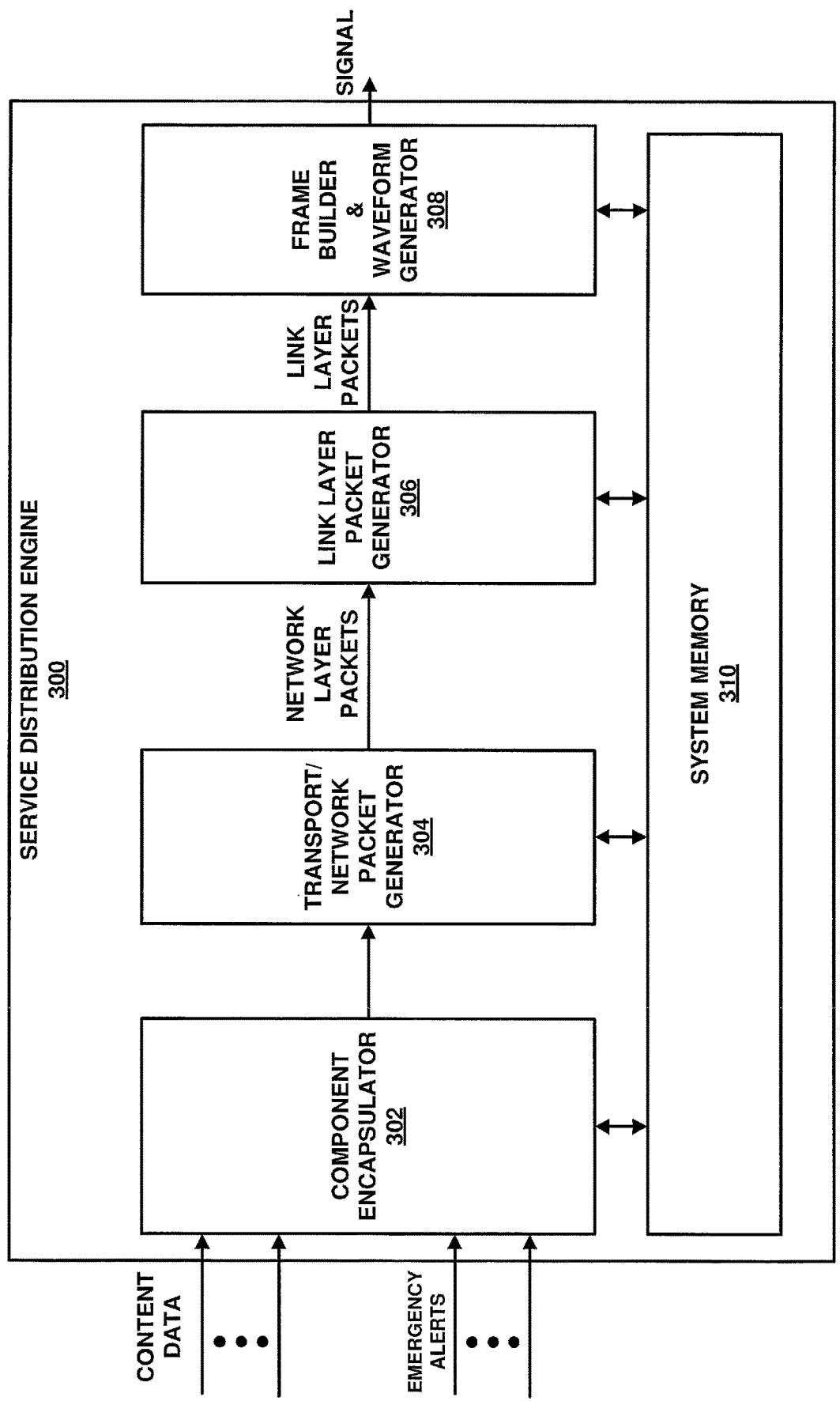
FIG. 3 is a block diagram illustrating an example of a service distribution engine that may implement one or more techniques of this disclosure.

FIG. 3 is a block diagram illustrating an example of a service distribution engine that may implement one or more techniques of this disclosure. Service distribution engine 300 may be configured to receive data and output a signal representing that data for distribution over a communication network, e.g., television service network 204. For example, service distribution engine 300 may be configured to receive one or more sets of data and output a signal that may be transmitted using a single radio frequency band (e.g., a 6 MHz channel, an 8 MHz channel, etc.) or a bonded channel (e.g., two separate 6 MHz channels).

As illustrated in FIG. 3, service distribution engine 300 includes component encapsulator 302, transport and network packet generator 304, link layer packet generator 306, frame builder and waveform generator 308, and system memory 310. Each of component encapsulator 302, transport and network packet generator 304, link layer packet generator 306, frame builder and waveform generator 308, and system memory 310 may be interconnected (physically, communicatively, and/or operatively) for inter-component communications and may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. It should be noted that although service distribution engine 300 is illustrated as having distinct functional blocks, such an illustration is for descriptive purposes and does not limit service distribution engine 300 to a particular hardware architecture. Functions of service distribution engine 300 may be realized using any combination of hardware, firmware and/or software implementations.

System memory 310 may be described as a non-transitory or tangible computer-readable storage medium. In some examples, system memory 310 may provide temporary and/or long-term storage. In some examples, system memory 310 or portions thereof may be described as non-volatile memory and in other examples portions of system memory 310 may be described as volatile memory. Examples of volatile memories include random access memories (RAM), dynamic random access memories (DRAM), and static random access memories (SRAM). Examples of non-volatile memories include magnetic hard discs, optical discs, floppy discs, flash memories, or forms of electrically programmable memories (EPROM) or electrically erasable and programmable (EEPROM) memories. System memory 310 may be configured to store information that may be used by service distribution engine 300 during operation. It should be noted that system memory 310 may include individual memory elements included within each of component encapsulator 302, transport and network packet generator 304, link layer packet generator 306, and frame builder and waveform generator 308. For example, system memory 310 may include one or more buffers (e.g., First-in First-out (FIFO) buffers) configured to store data for processing by a component of service distribution engine 300.

Component encapsulator 302 may be configured to receive one or more components of a service and encapsulate the one or more components according to a defined data structure. For example, component encapsulator 302 may be configured to receive one or more media components and generate a package based on MMTP. Further, component encapsulator 302 may be configured to receive one or more media components and generate media presentation based on Dynamic Adaptive Streaming Over HTTP (DASH). It should be noted that in some examples, component encapsulator 302 may be configured to generate service layer signaling data.

Transport and network packet generator 304 may be configured to receive a transport package and encapsulate the transport package into corresponding transport layer packets (e.g., UDP, Transport Control Protocol (TCP), etc.) and network layer packets (e.g., IPv4, IPv6, compressed IP packets, etc.). In one example, transport and network packet generator 304 may be configured to generate signaling information that is carried in the payload of IP packets having an address and/or port dedicated to signaling function. That is, for example, transport and network packet generator 304 may be configured to generate LLS tables according to one or more techniques of this disclosure.

Link layer packet generator 306 may be configured to receive network packets and generate packets according to a defined link layer packet structure (e.g., an ATSC 3.0 link layer packet structure). Frame builder and waveform generator 308 may be configured to receive one or more link layer packets and output symbols (e.g., OFDM symbols) arranged in a frame structure. As described above, a frame may include one or more PLPs may be referred to as a physical layer frame (PHY-Layer frame). As described above, a frame structure may include a bootstrap, a preamble, and a data payload including one or more PLPs. A bootstrap may act as a universal entry point for a waveform. A preamble may include so-called Layer-1 signaling (L1-signaling). L1-signaling may provide the necessary information to configure physical layer parameters. Frame builder and waveform generator 308 may be configured to produce a signal for transmission within one or more of types of RF channels: a single 6 MHz channel, a single 7 MHz channel, single 8 MHz channel, a single 11 MHz channel, and bonded channels including any two or more separate single channels (e.g., a 14 MHz channel including a 6 MHz channel and a 8 MHz channel). Frame builder and waveform generator 308 may be configured to insert pilots and reserved tones for channel estimation and/or synchronization. In one example, pilots and reserved tones may be defined according to an Orthogonal Frequency Division Multiplexing (OFDM) symbol and sub-carrier frequency map. Frame builder and waveform generator 308 may be configured to generate an OFDM waveform by mapping OFDM symbols to sub-carriers. It should be noted that in some examples, frame builder and waveform generator 308 may be configured to support layer division multiplexing. Layer division multiplexing may refer to super-imposing multiple layers of data on the same RF channel (e.g., a 6 MHz channel). Typically, an upper layer refers to a core (e.g., more robust) layer supporting a primary service and a lower layer refers to a high data rate layer supporting enhanced services. For example, an upper layer could support basic High Definition video content and a lower layer could support enhanced Ultra-High Definition video content.

As described above, transport and network packet generator 304 may be configured to generate LLS tables according to one or more techniques of this disclosure. It should be noted that in some examples, a service distribution engine (e.g., service distribution engine 208 or service distribution engine 300) or specific components thereof may be configured to generate signaling messages according to the techniques described herein. As such, description of signaling messages, including data fragments, with respect to transport and network packet generator 304 should not be construed to limit the techniques described herein. In some cases, it may be useful and/or necessary for a receiver device to temporally suspend applications and/or change how a multimedia presentation is rendered in order to increase the likelihood that a user is aware of the emergency alert message. As described above, currently proposed techniques for signaling information associated with emergency alert messages may be less than ideal.

Transport and network packet generator 304 may be configured to signal and/or generate an emergency alert message. In one example, transport and network packet generator 304 may be configured to generate a AEA message based on the example structure provide with respect to Table 2. In one example, transport and network packet generator 304 may be configured to generate an LLS table based on the example syntax provided in Table 10. It should be noted that in Table 10 reference is made to Table 2. In this manner, Table 10 may include elements and attributes included in Table 2. However, as illustrated in Table 10 Media Element and its attributes are distinct from the Media Element provided with respect to Table 2.

TABLE 10

| Element or Attribute Name | Use | Data Type | Short Description |
|---|---|---|---|
| AEAT | | | Root element of the AEAT |
| AEA | 1 . . . N | | Advanced Emergency Alert formatted as AEA-MF. |
| | | FOR EXAMPLE, AS PROVIDED IN TABLE 2 | |
| Media | 0 . . . N | | Contains the component parts of the multimedia resource. |
| @lang | 0 . . . 1 | language | The code denoting the language of the respective element Media |
| @mediaDesc | 0 . . . 1 | String | Text describing the content of the media file |
| @uri | 1 | anyURI | The identifier of the media file |
| @contentType | 0 . . . 1 | String | MIME-Type of media content referenced by Media@uri |

TABLE 10-continued

| Element or Attribute Name | Use | Data Type | Short Description |
|---|---|---|---|
| @contentLength | 0 . . . 1 | unsignedLong | Size in bytes of media content referenced by Media@uri |
| Signature | 0 . . . 1 | Any | |

In the example illustrated in Table 10, each of Media@lang, Media@mediaDesc, Media@contentType, and Media@contentLength may be based on the following example semantics:

Media@lang—This attribute shall identify the respective language for each Media resource, to help instruct the recipient if different language instances of the same multimedia are being sent. This attribute shall represent the language for media resource specified by Media element, and which shall be represented by formal natural language identifiers as defined by BCP 47. When not present the value of this attribute shall be inferred to be "en" (English). In another example when not present the value of this attribute shall be inferred to be "EN" (English).

In another example, when not present a default value specified in the standard shall be used for inference. For example, instead of "en" (English) this language could be "es" (Spanish), "kr" (Korean) or some other language.

Media@mediaDesc—A string that shall, in plain text, describe the content of the Media resource. The description should indicate the media information. For example "Evacuation map" or "Doppler radar image" etc. The language of the Media@mediaDesc shall be inferred to be same as the language indicated in Media @ lang.

Media@contentType—A string that shall, represent MIME type of media content referenced by Media@uri. In one example, Media@contentType shall obey the semantics of Content-Type header of HTTP/1.1 protocol as provided in IETF RFC 7231. In another example Media@contentType shall obey the semantics of Content-Type header of HTTP/1.1 protocol as provided in IETF RFC 2616.

Media@contentLength—A string that shall, represent size in bytes of media content referenced by Media@uri.

With respect to the semantics provided above, providing a default value for optionally signaled Media@lang may improve signaling efficiency. Further, in the example illustrated in Table 10, a media content type) and a media description are signaled separately (i.e., using distinct attributes). With respect to Table 10 it should be noted that as used herein MIME type may generally refer to a media or content type in some cases and in other cases may be associated with defined media or content types based on Multipurpose Internet Mail Extensions. Separately signaling a media content type and a media description may enable media to be retrieved in an efficient manner. That is, separately signaling a media content type and a media description may enable additional determinations to be made with respect to whether media content should be retrieved by a receiver device. For example, if the receiver device is capable of only decoding certain media types, then it can check capability against the signaled media content type and determine if it has ability to decode the content. In this case, a receiver device may only download content that it can decode.

In the example illustrated in Table 10, Media@contentType attribute is machine readable and not a free form string. Signaling a machine readable attribute may enable a receiver device to determine whether to retrieve media content. For example, a MIME-type may indicate a file type that is not supported by a receiver device (e.g., a shockwave flash format file (.swf) file) and in this case, a receiver device may not retrieve the file. In a similar manner, information regarding the file size of a media resource may be used to determine whether a media resource should be retrieved. For example, a receiver device may be configured to only retrieve files having a size lower than a threshold. For example, a setting of a receiver device may enable a user to prevent relatively large video files from being retrieved. In one example, this setting may be based on the available memory capacity of the device and/or the available network bandwidth to the receiver device.

In some examples, a user of a receiver device may determine whether to retrieve content based on media attributes presented to the user. For example, in one example, a receiver device may cause the media description to be presented to a user of a receiver device and based on the description, a user may determine whether to retrieve the content. In this manner, it is useful and potentially necessary for the language of the media description language to be signaled. In the example above, the language is inferred to be same as Media@lang. In one example, a mandatory or optional attribute may be included in Table 10 to signal the language of the media descriptor. In one example, this attribute may be an attribute of Media element. In one example, this attribute may be based on the following semantics:

Media@mediaDescLang—This attribute shall specify the language of text specified in Media@mediaDesc. This value shall be as defined by BCP 47. When not present the value of this attribute shall be inferred to be "en" (English). Media@mediaDescLang shall not be present when Media@mediaDesc is not present.

Although in the above example the fields contentType, contentLength and mediaDescLang are indicated to be signaled as XML attributes of the Media XML element, in another example they may be signaled as XML elements (instead of XML attributes) inside Media XML element. In this manner, transport and network packet generator 304 may be configured to signal information associated with the additional media resource associated with an emergency alert message.

As described above, a watermark may be used to signal an emergency alert message, e.g., advanced emergency alert message( ) as provided in Table 6. Service distribution engine 300 may be configured to generate signal an emergency alert message based on the example advanced emergency alert message( ) as provided in Table 11.

TABLE 11

| Syntax | No. of Bits | Format |
|---|---|---|
| advanced_emergency_alert_message( ) { | | |
|     AEA_ID_length (N1) | 8 | uimsbf |
|     AEA_ID | 8 * (N1) | |

TABLE 11-continued

| Syntax | No. of Bits | Format |
|---|---|---|
| AEA_issuer_length (N2) | 8 | uimsbf |
| AEA_issuer | 8 * (N2) | |
| effective | 32 | uimsbf |
| expires | 32 | uimsbf |
| reserved | 1 | '1' |
| event_code_type_length (N3) | 3 | uimsbf |
| event_code_length (N4) | 4 | uimsbf |
| event_code_type | 8 * (N3) | |
| event_code | 8 * (N4) | |
| audience | 3 | uimsbf |
| AEA_type | 3 | uimsbf |
| priority | 4 | uimsbf |
| ref_AEA_ID_flag | 1 | bslbf |
| reserved | 1 | '1' |
| num_AEA_text_minus1 | 2 | uimsbf |
| num_location_minus1 | 2 | uimsbf |
| if(ref_AEA_ID_flag == 'true') | | |
|     ref_AEA_ID_length (N5) | 8 | uimsbf |
|     ref_AEA_ID | 8 * (N5) | |
| } | | |
| for(i=0; i<num_AEA_text_minus1+1; i++){ | | |
|     AEA_text_lang_code | 16 | 2*char |
|     AEA_text_length (N6) | 8 | uimsbf |
|     AEA_text | 8 * (N6) | |
| } | | |
| for(i=0; i<num_location_minus1+1; i++){ | | |
|     reserved | 5 | '11111' |
|     location_type | 3 | uimsbf |
|     location_length (N7) | 8 | uimsbf |
|     location | 8 * (N7) | |
| } | | |
| } | | |

In the example illustrated in Table 11, each of syntax elements AEA_ID_length; AEA_ID; AEA_issuer_length; AEA_issuer; effective; expires; event_code_type_length; event_code_length; event_code_type; event_code; audience; AEA_type; priority; ref_AEA_ID_flag; ref_AEA_ID_length; ref_AEA_ID; AEA_text_lang_code; AEA_text_length; AEA_text; location_type; location_length; and location may be based on the definitions provided above with respect to Table 6. Syntax elements num_AEA_text_minus1 and num_location_minus1 may be based on the following definitions.

num_AEA_text_minus1—This 2-bit unsigned integer field plus 1 gives the number of the AEA_text field in the AEA message.

num_location_minus1—This 2-bit unsigned integer field plus 1 gives the number of the location field in the AEA message.

As illustrated in Table 11, advanced_emergency_alert_message( ) may signal up to four AEA_text strings and up to four AEA location strings based on the respective 2-bit values of num_AEA_text_minus1 and num_location_minus1 ranging from 0 to 3. It should be noted that in one example, Table 11 may include a 24-bit AEA_text_lang_code. A 24-bit AEA_text_lang_code may be based on the following definition:

AEA_text_lang_code—A 24-bit unsigned integer field that shall represent the language of the AEA_text field and that shall be encoded as a 3-character language code as per ISO 639.2/B. Each character shall be encoded into 8 bits according to ISO 8859-1 (ISO Latin-1) and inserted in order into this field.

In the definition of AEA_text_lang_code above ISO 639.2/B is described in ISO 639-2:1998, Codes for the representation of names of languages—Part 2: Alpha-3 code and ISO 8859-1 (ISO Latin-1) is described in ISO/IEC 8859-1:1998, Information technology—8-bit single-byte coded graphic character sets—Part 1: Latin alphabet No. 1, each of which is incorporated by reference in its entirety.

Figure 4:
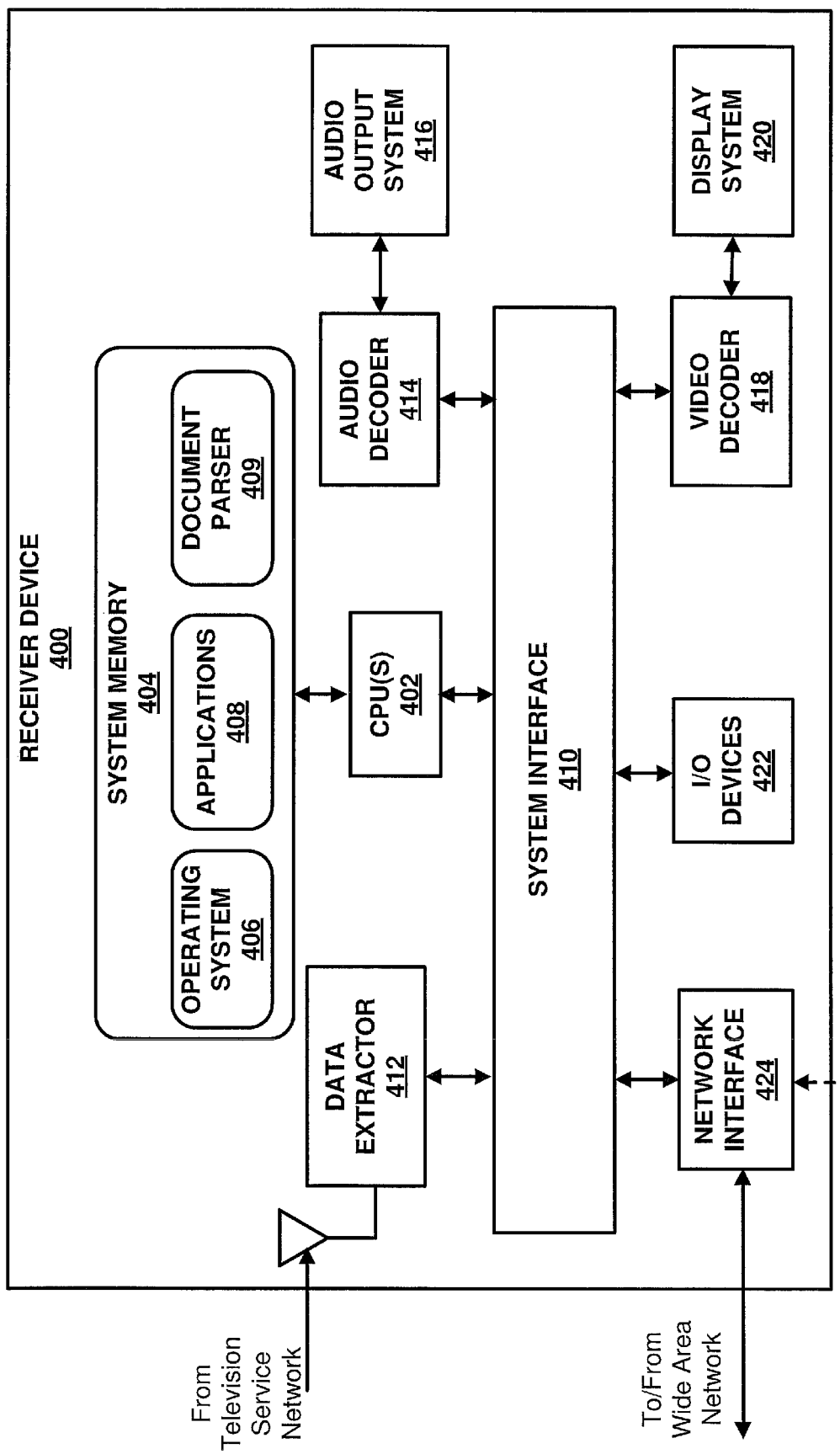
FIG. 4 is a block diagram illustrating an example of a receiver device that may implement one or more techniques of this disclosure.

FIG. 4 is a block diagram illustrating an example of a receiver device that may implement one or more techniques of this disclosure. That is, receiver device 400 may be configured to parse a signal based on the semantics described above with respect to one or more of the tables described above. In one example, receiver device 400 may be configured to receive an emergency alert message based on any combination of the example semantics described above, parse it, and then take an action. Further, receiver device 400 may be configured to enable media content associated with an emergency alert message to be retrieved. For example, a receiver device may be configured to temporally suspend applications and/or change how a multimedia presentation is rendered (e.g., for a specified duration for one or more services) in order to increase the likelihood that a user is aware of media content associated with an emergency alert message is available. Further, in one example receiver device 400 may be configured to enable a user to set how media content associated with an emergency alert messages is handled by receiver device 400. For example, a user may set one of the following preferences in a settings menu: a preference for types of media to be retrieved, a preference for certain types of media to be selectively retrieved, and a preference for certain types of media to never be retrieved.

Receiver device 400 is an example of a computing device that may be configured to receive data from a communications network via one or more types of data channels and allow a user to access multimedia content. In the example illustrated in FIG. 4, receiver device 400 is configured to receive data via a television network, such as, for example, television service network 204 described above. Further, in the example illustrated in FIG. 4, receiver device 400 is configured to send and receive data via a wide area network. It should be noted that in other examples, receiver device 400 may be configured to simply receive data through a television service network 204. The techniques described herein may be utilized by devices configured to communicate using any and all combinations of communications networks.

As illustrated in FIG. 4, receiver device 400 includes central processing unit(s) 402, system memory 404, system interface 410, data extractor 412, audio decoder 414, audio output system 416, video decoder 418, display system 420, I/O device(s) 422, and network interface 424. As illustrated in FIG. 4, system memory 404 includes operating system 406, applications 408, and document parser 409. Each of central processing unit(s) 402, system memory 404, system interface 410, data extractor 412, audio decoder 414, audio output system 416, video decoder 418, display system 420, I/O device(s) 422, and network interface 424 may be interconnected (physically, communicatively, and/or operatively) for inter-component communications and may be implemented as any of a variety of suitable circuitry, such as one or more microprocessors, digital signal processors (DSPs), application specific integrated circuits (ASICs), field programmable gate arrays (FPGAs), discrete logic, software, hardware, firmware or any combinations thereof. It should be noted that although receiver device 400 is illustrated as having distinct functional blocks, such an illustration is for descriptive purposes and does not limit receiver device 400 to a particular hardware architecture. Functions of receiver device 400 may be realized using any combination of hardware, firmware and/or software implementations.

CPU(s) 402 may be configured to implement functionality and/or process instructions for execution in receiver device 400. CPU(s) 402 may include single and/or multi-core central processing units. CPU(s) 402 may be capable of retrieving and processing instructions, code, and/or data structures for implementing one or more of the techniques described herein. Instructions may be stored on a computer readable medium, such as system memory 404.

System memory 404 may be described as a non-transitory or tangible computer-readable storage medium. In some examples, system memory 404 may provide temporary and/or long-term storage. In some examples, system memory 404 or portions thereof may be described as non-volatile memory and in other examples portions of system memory 404 may be described as volatile memory. System memory 404 may be configured to store information that may be used by receiver device 400 during operation. System memory 404 may be used to store program instructions for execution by CPU(s) 402 and may be used by programs running on receiver device 400 to temporarily store information during program execution. Further, in the example where receiver device 400 is included as part of a digital video recorder, system memory 404 may be configured to store numerous video files.

Applications 408 may include applications implemented within or executed by receiver device 400 and may be implemented or contained within, operable by, executed by, and/or be operatively and/or communicatively coupled to components of receiver device 400. Applications 408 may include instructions that may cause CPU(s) 402 of receiver device 400 to perform particular functions. Applications 408 may include algorithms which are expressed in computer programming statements, such as, for-loops, while-loops, if-statements, do-loops, etc. Applications 408 may be developed using a specified programming language. Examples of programming languages include, Java™, Jini™, C, C++, Objective C, Swift, Perl, Python, PhP, UNIX Shell, Visual Basic, and Visual Basic Script. In the example where receiver device 400 includes a smart television, applications may be developed by a television manufacturer or a broadcaster. As illustrated in FIG. 4, applications 408 may execute in conjunction with operating system 406. That is, operating system 406 may be configured to facilitate the interaction of applications 408 with CPUs(s) 402, and other hardware components of receiver device 400. Operating system 406 may be an operating system designed to be installed on set-top boxes, digital video recorders, televisions, and the like. It should be noted that techniques described herein may be utilized by devices configured to operate using any and all combinations of software architectures.

As described above, an application may be a collection of documents constituting an enhanced or interactive service. Further, document may be used to describe an emergency alert or the like according to a protocol. Document parser 409 may be configured to parse a document and cause a corresponding function to occur at receiver device 400. For example, document parser 409 may be configured to parse a URL from a document and receiver device 400 may retrieved data corresponding to the URL.

System interface 410 may be configured to enable communications between components of receiver device 400. In one example, system interface 410 comprises structures that enable data to be transferred from one peer device to another peer device or to a storage medium. For example, system interface 410 may include a chipset supporting Accelerated Graphics Port (AGP) based protocols, Peripheral Component Interconnect (PCI) bus based protocols, such as, for example, the PCI Express™ (PCIe) bus specification, which is maintained by the Peripheral Component Interconnect Special Interest Group, or any other form of structure that may be used to interconnect peer devices (e.g., proprietary bus protocols).

As described above, receiver device 400 is configured to receive and, optionally, send data via a television service network. As described above, a television service network may operate according to a telecommunications standard. A telecommunications standard may define communication properties (e.g., protocol layers), such as, for example, physical signaling, addressing, channel access control, packet properties, and data processing. In the example illustrated in FIG. 4, data extractor 412 may be configured to extract video, audio, and data from a signal. A signal may be defined according to, for example, aspects DVB standards, ATSC standards, ISDB standards, DTMB standards, DMB standards, and DOCSIS standards. Data extractor 412 may be configured to extract video, audio, and data, from a signal generated by service distribution engine 300 described above. That is, data extractor 412 may operate in a reciprocal manner to service distribution engine 300.

Data packets may be processed by CPU(s) 402, audio decoder 414, and video decoder 418. Audio decoder 414 may be configured to receive and process audio packets. For example, audio decoder 414 may include a combination of hardware and software configured to implement aspects of an audio codec. That is, audio decoder 414 may be configured to receive audio packets and provide audio data to audio output system 416 for rendering. Audio data may be coded using multi-channel formats such as those developed by Dolby and Digital Theater Systems. Audio data may be coded using an audio compression format. Examples of audio compression formats include Motion Picture Experts Group (MPEG) formats, Advanced Audio Coding (AAC) formats, DTS-HD formats, and Dolby Digital (AC-3, AC-4, etc.) formats. Audio output system 416 may be configured to render audio data. For example, audio output system 416 may include an audio processor, a digital-to-analog converter, an amplifier, and a speaker system. A speaker system may include any of a variety of speaker systems, such as headphones, an integrated stereo speaker system, a multi-speaker system, or a surround sound system.

Video decoder 418 may be configured to receive and process video packets. For example, video decoder 418 may include a combination of hardware and software used to implement aspects of a video codec. In one example, video decoder 418 may be configured to decode video data encoded according to any number of video compression standards, such as ITU-T H.262 or ISO/IEC MPEG-2 Visual, ISO/IEC MPEG-4 Visual, ITU-T H.264 (also known as ISO/IEC MPEG-4 Advanced video Coding (AVC)), and High-Efficiency Video Coding (HEVC). Display system 420 may be configured to retrieve and process video data for display. For example, display system 420 may receive pixel data from video decoder 418 and output data for visual presentation. Further, display system 420 may be configured to output graphics in conjunction with video data, e.g., graphical user interfaces. Display system 420 may comprise one of a variety of display devices such as a liquid crystal display (LCD), a plasma display, an organic light emitting diode (OLED) display, or another type of display device capable of presenting video data to a user. A display device may be configured to display standard definition content, high definition content, or ultra-high definition content.

I/O device(s) 422 may be configured to receive input and provide output during operation of receiver device 400. That is, I/O device(s) 422 may enable a user to select multimedia content to be rendered. Input may be generated from an input device, such as, for example, a push-button remote control, a device including a touch-sensitive screen, a motion-based input device, an audio-based input device, or any other type of device configured to receive user input. I/O device(s) 422 may be operatively coupled to receiver device 400 using a standardized communication protocol, such as for example, Universal Serial Bus protocol (USB), Bluetooth, ZigBee or a proprietary communications protocol, such as, for example, a proprietary infrared communications protocol.

Network interface 424 may be configured to enable receiver device 400 to send and receive data via a local area network and/or a wide area network. Network interface 424 may include a network interface card, such as an Ethernet card, an optical transceiver, a radio frequency transceiver, or any other type of device configured to send and receive information. Network interface 424 may be configured to perform physical signaling, addressing, and channel access control according to the physical and Media Access Control (MAC) layers utilized in a network. Receiver device 400 may be configured to parse a signal generated according to any of the techniques described above with respect to FIG. 3. Further, receiver device 400 may be configured to send data to and receive data from a companion device according to one or more communication techniques.

Figure 5:
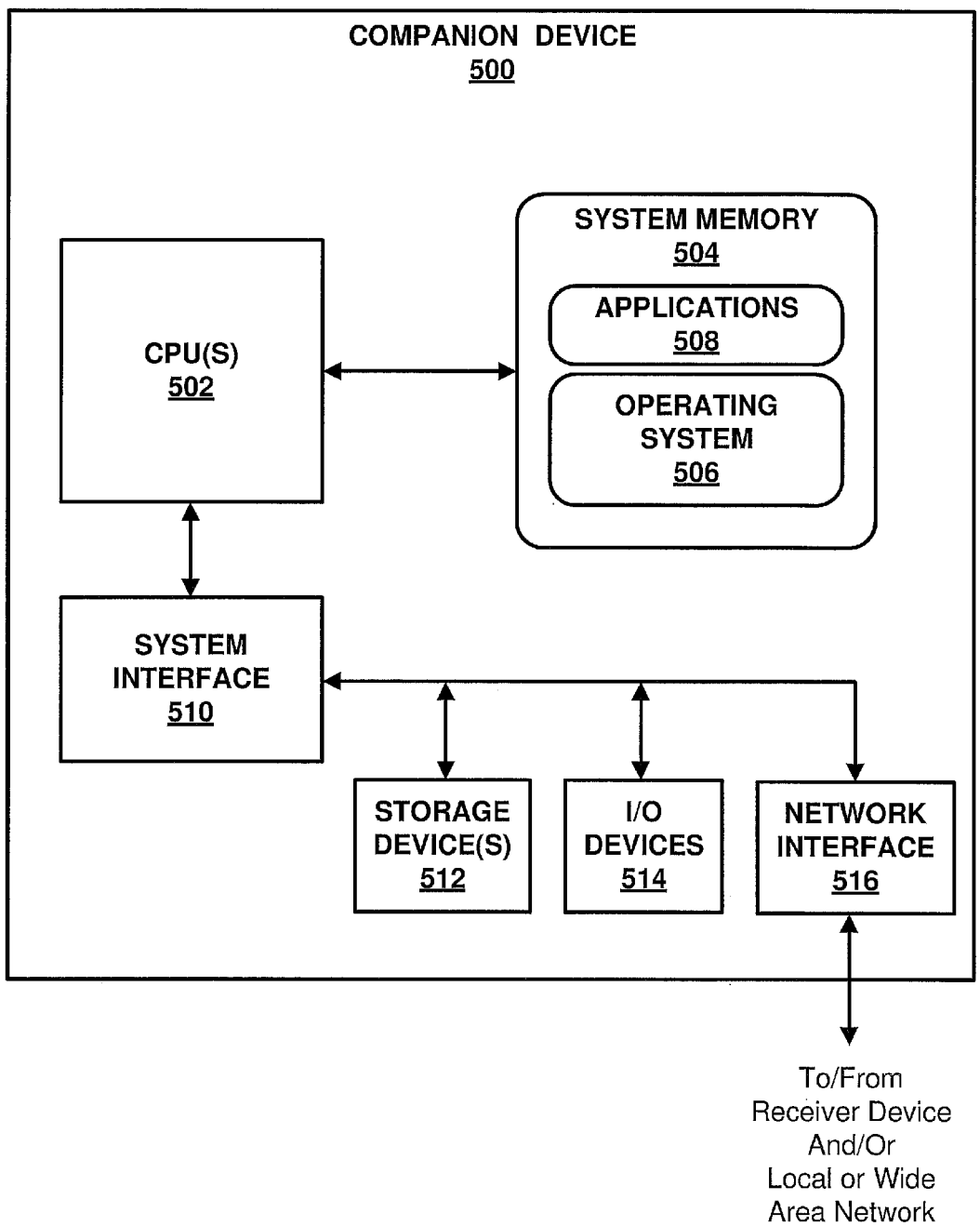
FIG. 5 is a block diagram illustrating an example of a receiver device that may implement one or more techniques of this disclosure.

FIG. 5 is a block diagram illustrating an example of a companion device that may implement one or more techniques of this disclosure. Companion device 500 may include one or more processors and a plurality of internal and/or external storage devices. Companion device 500 is an example a device configured to receive a content information communication message. Companion device 500 may include one or more applications running thereon that may utilize information included in a content information communication message. Companion device 500 may be equipped for wired and/or wireless communications and may include devices, such as, for example, desktop or laptop computers, mobile devices, smartphones, cellular telephones, personal data assistants (PDA), tablet devices, and personal gaming devices.

As illustrated in FIG. 5, companion device 500 includes central processing unit(s) 502, system memory 504, system interface 510, storage device(s) 512, I/O device(s) 514, and network interface 516. As illustrated in FIG. 5, system memory 504 includes operating system 506 and applications 508. It should be noted that although example companion device 500 is illustrated as having distinct functional blocks, such an illustration is for descriptive purposes and does not limit companion device 500 to a particular hardware or software architecture. Functions of companion device 500 may be realized using any combination of hardware, firmware and/or software implementations.

Each of central processing unit(s) 502, system memory 504, and system interface 510, may be similar to central processing unit(s) 502, system memory 504, and system interface 510 described above. Storage device(s) 512 represent memory of companion device 500 that may be configured to store larger amounts of data than system memory 504. For example, storage device(s) 512 may be configured to store a user's multimedia collection. Similar to system memory 504, storage device(s) 512 may also include one or more non-transitory or tangible computer-readable storage media. Storage device(s) 512 may be internal or external memory and in some examples may include non-volatile storage elements. Storage device(s) 512 may include memory cards (e.g., a Secure Digital (SD) memory card, including Standard-Capacity (SDSC), High-Capacity (SDHC), and eXtended-Capacity (SDXC) formats), external hard disk drives, and/or an external solid state drive.

I/O device(s) 514 may be configured to receive input and provide output for computing device 514. Input may be generated from an input device, such as, for example, touch-sensitive screen, track pad, track point, mouse, a keyboard, a microphone, video camera, or any other type of device configured to receive input. Output may be provided to output devices, such as, for example, speakers or a display device. In some examples, I/O device(s) 514 may be external to companion device 500 and may be operatively coupled to companion device 500 using a standardized communication protocol, such as for example, Universal Serial Bus (USB) protocol.

Network interface 516 may be configured to enable companion device 500 to communicate with external computing devices, such as receiver device 400 and other devices or servers. Further, in the example where companion device 500 includes a smartphone, network interface 516 may be configured to enable companion device 500 to communicate with a cellular network. Network interface 516 may include a network interface card, such as an Ethernet card, an optical transceiver, a radio frequency transceiver, or any other type of device that can send and receive information. Network interface 516 may be configured to operate according to one or more communication protocols such as, for example, a GSM standard, a CDMA standard, a 3GPP standard, an IP standard, a WAP standard, Bluetooth, ZigBee, and/or an IEEE standard, such as, one or more of the 802.11 standards, as well as various combinations thereof.

As illustrated in FIG. 5, system memory 504 includes operating system 506 and applications 508 stored thereon. Operating system 506 may be configured to facilitate the interaction of applications 508 with central processing unit(s) 502, and other hardware components of companion device 500. Operating system 506 may be an operating system designed to be installed on laptops and desktops. For example, operating system 506 may be a Windows (registered trademark) operating system, Linux, or Mac OS. Operating system 506 may be an operating system designed to be installed smartphones, tablets, and/or gaming devices. For example, operating system 506 may be an Android, iOS, WebOS, Windows Mobile (registered trademark), or a Windows Phone (registered trademark) operating system. It should be noted that the techniques described herein are not limited to a particular operating system.

Applications 508 may be any applications implemented within or executed by companion device 500 and may be implemented or contained within, operable by, executed by, and/or be operatively and/or communicatively coupled to components of companion device 500. Applications 508 may include instructions that may cause central processing unit(s) 502 of companion device 500 to perform particular functions. Applications 508 may include algorithms which are expressed in computer programming statements, such as, for loops, while-loops, if-statements, do-loops, etc. Further, applications 508 may include second screen applications.

As described above, receiver device 400 may be configured to receive an emergency alert message based on any combination of the example semantics described above, parse it, and then take an action. In one example, receiver device 400 may be configured to communicate information included in an emergency alert message to a companion device, e.g., companion device 500. In this example, the receiver device 400 may be termed a "primary device." Companion device 500 and/or applications 508 may be configured to receive the information and parse content information for use in a second screen application. Table 12 provides an example of the structure of a notification message that may be sent from a primary device to a companion device.

TABLE 12

| Element Name | Cardinality | Data type | Description |
| --- | --- | --- | --- |
| PDCDMessageVersion | 1 | Unsigned Integer | Version of the notification message structure. The upper 6 bits shall indicate major version and lower two bits shall indicate minor version. The version of this notification message structure shall be 0x004 i.e. version 1.0. |
| PDCDServiceName | 1 | String | The service name, which uniquely identifies the PD-CD service. The enumerated service name values are as defined. PD and CD conforming to this version of this specification shall be capable of ignoring a message received with PDCDServiceName other than the names defined. |
| MessageBody | 0 . . . 1 | Bytes | Message specific data elements. The syntax and semantics of the MessageBody is defined in individual messages of individual services. |

In one example, receiver device 400 may be configured to communicate information included in an emergency alert message to a companion device according to a JSON based schema. Table 13 describes the structure of the AEAT element according to a JSON based schema. FIGS. 6A-6B is a computer program listing based on the example provided in Table 13. It should be noted that with respect to Table 13, a media content type (i.e., MIME-type) and a media description are signaled separately. In this manner, receiver device 400 may be configured to send a message to companion device 500 based on the example schema provided in Table 13 in order for a companion device 500 to retrieve media content. For example, a user may have a preference to retrieve certain types of media (e.g., a .pdf file) using a companion device.

TABLE 13

| Element or Attribute Name | Cardinality | Data Type | Short Description |
| --- | --- | --- | --- |
| MessageBody | 1 | | See Table 12 |
| AEAT | | | Root element of the AEAT |
|   AEA | 1 . . . N | | Advanced Emergency Alert formatted as AEA-MF. |
|     AEAid | 1 | string | The identifier of AEA message. |
|     issuer | 1 | string | The identifier of the broadcast station originating or forwarding the message. |
|     audience | 1 | string | The intended distribution of the AEA message. |
|     AEAtype | 1 | string | The category of the message. |
|     refAEAid | 0 . . . 1 | string | The referenced identifier of AEA message. It shall appear when the AEAtype is "update" or "cancel". |
|     priority | 1 | integer | The priority of the message |
|     Header | 1 | object | The container for the basic alert envelope. |
|       effective | 1 | date-time | The effective time of the alert message. |
|       expires | 1 | date-time | The expiration time of the alert message. |
|       EventCode | 1 | Object | |
|         value | 1 | string | A code identifying the event type of the AEA message |
|         type | 1 | string | A national-assigned string designating the domain of the code (e.g. SAME in US, . . . ) |
|       Location | 1 . . . N | object | |
|         value | 1 | string | The geographic code delineating the affected area of the alert message |
|         type | 1 | string | A national-assigned string designating the domain of the code (e.g. "FIPS" in US, or "SGC" in Canada . . . ) |
|     AEAtext | 1 . . . N | string | |
|       value | 1 | string | Contains the specific text of the emergency notification |
|       lang | 1 | string | The code denoting the language of the respective element of the alert text |
|     Media | 0 . . . N | | Contains the component parts of the multimedia resource. |
|       lang | 0 . . . 1 | string | The code denoting the language of the respective element Media |
|       mediaDesc | 0 . . . 1 | string | Text describing the content of the media file |
|       uri | 1 | string | The identifier of the media file |
|       contentType | 0 . . . 1 | string | MIME-Type of media content referenced by Madia.uri |
|       contentLength | 0 . . . 1 | unsignedLong | Size in bytes of media content referenced by Media.uri |
|     Signature | 0 . . . 1 | object | Signature for the message |

It should be noted that semantics of elements and attributes included in Table 13 generally correspond to those provided above with respect to Table 2 and Table 6 and for the sake of brevity example formal definitions except for the following semantics of elements and attributes:

Header—This object shall contain the relevant envelope information for the alert, including the type of alert (EventCode), the time the alert is effective (effective), the time it expires (expires), and the location of the targeted alert area (Location).

Header.effective—This date-time shall contain the effective time of the alert message. The date-time shall be represented according to JSON "type": "string", and "format": "date-time".

Header.expires—This date-time shall contain the expiration time of the alert message. The date-time shall be represented according to JSON "type": "string", and "format": "date-time".

EventCode—An object, which provides information about event_code value and type of event.

EventCode.value—string that shall identify the event type of the alert message formatted as a string (which may represent a number) denoting the value itself (e.g., in the U.S., a value of "EVI" would be used to denote an evacuation warning). Values may differ from nation to nation, and may be an alphanumeric code, or may be plain text. Only one EventCode shall be present per AEA message.

EventCode.type—This property shall be a national-assigned string value that shall designate the domain of the EventCode (e.g., in the U.S., "SAME" denotes standard FCC Part 11 EAS coding). Values of type that are acronyms should be represented in all capital letters without periods.

Location—An object, which provides information about geographical location value and type of location.

Location.value—A string that shall describe a message target with a geographically-based code.

Location.type—This property shall be string that identifies the domain of the Location code.

AEAtext—An object, which provides information about advanced emergency alert message text value and language of the text.

AEAtext.value—A string of the plain text of the emergency message. Each AEAtext element shall include exactly one lang attribute. For AEAtext of the same alert in multiple languages, this element shall require the presence of multiple AEAtext elements.

In one example, receiver device 400 may be configured to communicate information included in an emergency alert message to a companion device according to the structure of the AEAT element illustrated in Table 14. FIGS. 7A-7C is a computer program listing based on the example provided in Table 14.

TABLE 14

| Element or Attribute Name | Cardinality | Data Type | Short Description |
|---|---|---|---|
| MessageBody | 1 | | See Table 12 |
| AEAT | | | Root element of the AEAT |
|   AEA | 1 . . . N | | Advanced Emergency Alert formatted as AEA-MF. |
|     AEAid | 1 | string | The identifier of AEA message. |
|     issuer | 1 | string | The identifier of the broadcast station originating or forwarding the message. |
|     audience | 1 | string | The intended distribution of the AEA message. |
|     AEAtype | 1 | string | The category of the message. |
|     refAEAid | 0 . . . 1 | string | The referenced identifier of AEA message. It shall appear when the AEAtype is "update" or "cancel". |
|     priority | 1 | integer | The priority of the message |
|     Header | 1 | object | The container for the basic alert envelope. |
|       effective | 1 | date-time | The effective time of the alert message. |
|       expires | 1 | date-time | The expiration time of the alert message. |
|       EventCode | 1 | Object | |
|         value | 1 | string | A code identifying the event type of the AEA message |
|         type | 1 | string | A national-assigned string designating the domain of the code (e.g. SAME in US, . . . ) |
|       EventDesc | 0 . . . N | Object | |
|         value | 1 | string | The short plain text description of the emergency event (e.g. "Tornado Warning" or "Tsunami Warning"). |
|         lang | 1 | String | The code denoting the language of the respective element of the EventDesc |
|       Location | 1 . . . N | object | |
|         value | 1 | string | The geographic code delineating the affected area of the alert message |
|         type | 1 | string | A national-assigned string designating the domain of the code (e.g. "FIPS" in US, or "SGC" in Canada . . . ) |
|     AEAtext | 1 . . . N | string | |
|       value | 1 | string | Contains the specific text of the emergency notification |
|       ang | 1 | string | The code denoting the language of the respective element of the alert text |
|     LiveMedia | 0 . . . 1 | | |
|       bsid | 1 | integer | Identifier of the Broadcast Stream contains the emergency-related live A/V service. |

TABLE 14-continued

| Element or Attribute Name | Cardinality | Data Type | Short Description |
|---|---|---|---|
| serviceId | 1 | integer | Integer number that identifies the emergency-related A/V Service. |
| ServiceName | 0 . . . N | | |
| name | | string | A user-friendly name for the service where the LiveMedia is available |
| lang | | string | The language of the text described in the name |
| Media | 0 . . . N | | Contains the component parts of the multimedia resource. |
| lang | 0 . . . 1 | string | The code denoting the language of the respective Media |
| mediaDesc | 0 . . . 1 | string | Text describing the content of the media file |
| uri | 1 | string | The identifier of the media file |
| contentType | 0 . . . 1 | string | MIME-Type of media content referenced by Media.uri |
| contentLength | 0 . . . 1 | unsignedLong | Size in bytes of media content referenced by Media.uri |
| Signature | 0 . . . 1 | object | Signature for the message |

In one example, the semantics of elements and attributes included in Table 14 may be based on the following example definitions:

AEAT—Root of the AEAT.

AEA—Advanced Emergency Alerting Message. This is the parent object that has AEAid, issuer, audience, AEAtype, refAEAid, and priority properties plus the following child-objects: Header, AEAtext, and optionally LiveMedia, Media, and Signature.

AEA.AEAid—This property shall be a string value uniquely identifying the AEA message, assigned by the station (sender). The AEAid shall not include spaces, commas or restricted characters (< and &).

AEA.issuer—A string that shall identify the broadcast station originating or forwarding the message. issuer shall include an alphanumeric value, such as call letters, station ID, group name, or other identifying value. This string shall not exceed 32 characters.

AEA.audience—A string that shall identify the intended audience for the message. This value shall be the value of the AEAT.AEA@audience attribute of the current Advanced Emergency Alerting Message defined in [A/331].

AEA.refAEAid—A string that shall identify the AEAid of a referenced AEA message. It shall appear when the AEAtype is "update" or "cancel".

AEA.AEAtype—A string that shall identify the category of the AEA message. This value shall be the value of the AEAT.AEA@AEAtype attribute of the current Advanced Emergency Alerting Message defined in [A/331].

AEA.priority—The AEA message shall be the value of the AEAT.AEA@priority attribute of the current Advanced Emergency Alerting Message defined in [A/331].

Header—This object shall contain the relevant envelope information for the alert, including the type of alert (Event-Code), the time the alert is effective (effective), the time it expires (expires), and the location of the targeted alert area (Location).

Header.effective—This date-time shall contain the effective time of the alert message. The date and time shall be represented according to JSON "type": "string", and "format": "date-time".

Header.expires—This date/time shall contain the expiration time of the alert message. The date and time shall be represented according to JSON "type": "string", and "format": "date-time".

EventCode—An object, which provides information about event code value and type of event.

EventCode.value—A string that shall identify the event type of the alert message formatted as a string (which may represent a number) denoting the value itself (e.g., in the U.S., a value of "EVI" would be used to denote an evacuation warning). Values may differ from nation to nation, and may be an alphanumeric code, or may be plain text. Only one EventCode shall be present per AEA message.

EventCode.type—This property shall be a national-assigned string value that shall designate the domain of the EventCode (e.g., in the U.S., "SAME" denotes standard FCC Part 11 EAS coding). Values of type that are acronyms should be represented in all capital letters without periods.

If EventCode.type="SAME", then the EventCode.value shall be defined as a three letter event_code as defined in FCC's Part 11 rules on EAS (at 47 CFR 11.31(e)).

EventDesc—An object, which provides information about event description value and language of event.

EventDesc.value—A string that shall contain a short plain text description of the emergency event. This string shall not exceed 64 characters. When the EventCode object is present, the EventDesc should correspond to the event_code indicted in the EventCode.value (e.g. an EventDesc of "Tornado Warning" corresponds to the EAS EventCode.value of "TOR"). When an EventCode is not present, the EventDesc should provide a brief, user-friendly indication of the type of event (e.g. "School Closing").

EventDesc.lang—This property shall identify the language of the respective EventDesc.value of the alert message. This property shall be represented by formal natural language identifiers and shall not exceed 35 characters in length as defined by BCP 47. There shall be no implicit default value.

Location—An object, which provides information about geographical location value and type of location.

Location.value—A string that shall describe a message target with a geographically-based code.

Location.type—This property shall be string that identifies the domain of the Location code.

If type is equal to "FIPS", then the Location shall be defined as the Federal Information Processing Standard (FIPS) geographic codes as specified by the U.S. Federal Communications Commission in 47 CFR 11 (as amended) for the Emergency Alert System, which shall also include the 000000 national location code.

(http://www2.census.gov/geo/docs/reference/codes/files/national_county.txt)

If type is equal to "SGC", then the Location shall be defined as the Standard Geographic Classification codes as defined by Statistics Canada, Standard Geographical Classification (SGC) 2006—Volume I (updated May 2010).

(http://geodepotstatcan.gc.ca/2006/040120011618150421032019/031904_05-eng.jsp)

If type is equal to "polygon", then the Location shall define a geospatial space area consisting of a connected sequence of four or more coordinate pairs that form a closed, non-self-intersecting loop.

If type is equal to "circle", then the Location shall define a circular area is represented by a central point given as a coordinate pair followed by a space character and a radius value in kilometers.

Textual values of type are case sensitive, and shall be represented in all capital letters, with the exceptions of "polygon" and "circle".

AEAtext—An object, which provides information about advanced_emergency alert message text value and language of the text.

AEAtext.value—A string of the plain text of the emergency message. Each AEAtext object shall include exactly one AEAtext.lang property. For AEAtext of the same alert in multiple languages, shall require the presence of multiple AEAtext objects.

AEAtext.lang—This property shall identify the language of the respective AEAtext element of the alert message. This property shall be represented by formal natural language identifiers as defined by BCP 47, and shall not exceed 35 characters. There shall be no implicit default value.

LiveMedia—An object which provides identification of an Audio/Visual (A/V) service that may be presented to the user as a choice to tune for emergency-related information, e.g., ongoing news coverage.

LiveMedia.bsid—Identifier of the broadcast stream which contains the emergency-related live A/V service.

LiveMedia.serviceld—A 16-bit integer that shall uniquely identify the emergency-related live A/V service.

ServiceName—An object, which provides information about service name and language of the service name.

ServiceName.name—A user-friendly name for the service where the live media is available that the receiver can present to the viewer when presenting the option to tune to the LiveMedia, e.g., "WXYZ Channel 5."

ServiceName.lang—Shall identify the language of the respective ServiceName.name property of live media stream. This property shall be represented by formal natural language identifiers and shall not exceed 35 characters, as defined by BCP 47. There shall be no implicit default value.

Media—Shall contain the component parts of the multimedia resource, including the language (lang), description (mediaDesc) and location (uri) of the resource. Refers to an additional file with supplemental information related to the AEAtext; e.g., an image or audio file. Multiple instances may occur within an AEA message block.

Media.lang—This property shall identify the respective language for each Media resource, to help instruct the recipient if different language instances of the same multimedia are being sent. This property shall be represented by formal natural language identifiers as defined by BCP 47 and shall not exceed 35 characters. Media.lang element shall be present if the Media.mediaDesc is present.

Media.mediaDesc—A string that shall, in plain text, describe the content of the Media resource. The description should indicate the media information. For example "Evacuation map" or "Doppler radar image" etc. The language of the Media.mediaDesc shall be inferred to be same as the language indicated in Media.lang.

Media.uri—An optional property that shall include a full URL that can be used to retrieve the resource from a destination external from the message. When a rich media resource is delivered via broadband, the URL of the Media shall reference a file on a remote server. When a rich media resource is delivered via broadcast ROUTE, the URL for the resource shall begin with http://localhost/. The URL shall match the Content-Location attribute of the corresponding File element in the EFDT in the LCT channel delivering the file, or the Entity header of the file.

Media.contentType—A string that shall, represent MIME type of media content referenced by Media.uri. Media.contentType shall obey the semantics of Content-Type header of HTTP/1.1 protocol RFC 7231.

Media.contentLength—A string that shall, represent size in bytes of media content referenced by Media.uri Signature—An optional object that shall enable digitally signed messages between the station and the receiver.

As illustrated in Table 14, Table 14 includes EventDesc and LiveMedia objects. EventDesc provides a text description of an emergency event and LiveMedia provides information regarding live media available for a particular event (e.g., television programming). In this manner, a companion device may parse an instance of a AEA message provided according to the structure provided in Table 14 and cause a message to be presented to a user of the companion device. For example, a companion device may cause a pop-window notification displaying the following example text to be presented "Tornado in your area. Turn your Television to channel 5-1 WXYZ for more information." In response to the message, a user may cause a primary device to be tuned to the television channel identified in the message.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device (the video decoder and the video encoder) used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

<Overview>

According to one example of the disclosure, a method for signaling information associated with an emergency alert message comprises signaling a syntax element indicating a content type of a media resource associated with an emergency alert message, and signaling a syntax element providing a description of the media resource.

According to another example of the disclosure, a device for signaling information associated with an emergency alert message comprises one or more processors configured to signal a syntax element indicating a content type of a media resource associated with an emergency alert message, and signal a syntax element providing a description of the media resource.

According to another example of the disclosure, an apparatus comprises means for signaling a syntax element indicating a content type of a media resource associated with an emergency alert message, and means for signaling a syntax element providing a description of the media resource.

According to another example of the disclosure, a non-transitory computer-readable storage medium comprises instructions stored thereon that upon execution cause one or more processors of a device to signal a syntax element indicating a content type of a media resource associated with an emergency alert message, and signal a syntax element providing a description of the media resource.

According to one example of the disclosure, a method for retrieving a media resource associated with an emergency alert comprises receiving an emergency alert message from a service provider, parsing a syntax element indicating a content type of a media resource associated with an emergency alert message, and determining based at least in part on the syntax element indicating the content type whether to retrieve the media resource.

According to another example of the disclosure, a device for retrieving a media resource associated with an emergency alert comprises one or more processors configured to receive an emergency alert message from a service provider, parse a syntax element indicating a content type of a media resource associated with an emergency alert message, and determine based at least in part on the syntax element indicating the content type whether to retrieve the media resource.

According to another example of the disclosure, an apparatus comprises means for receiving an emergency alert message from a service provider, parsing a syntax element indicating a content type of a media resource associated with an emergency alert message, and determining based at least in part on the syntax element indicating the content type whether to retrieve the media resource.

According to another example of the disclosure, a non-transitory computer-readable storage medium comprises instructions stored thereon that upon execution cause one or more processors of a device to receive an emergency alert message from a service provider, parse a syntax element indicating a content type of a media resource associated with an emergency alert message, and determine based at least in part on the syntax element indicating the content type whether to retrieve the media resource.

The details of one or more examples are set forth in the accompanying drawings and the description below. Other features, objects, and advantages will be apparent from the description and drawings, and from the claims.

The invention claimed is:

1. A primary device for transferring an emergency alert message, the primary device comprising:
   a processor; and
   a memory associated with the processor, wherein
   the processor is configured to receive the emergency alert message and to transfer the emergency alert message to a companion device on a local area network, the emergency alert message includes (i) an event description element representing a description of an emergency event and (ii) a live media element representing an identification of an Audio/Visual service, the event description element includes a first language field identifying a language of the event description element of the emergency alert message, the live media element includes (i) a bsid field representing an identifier of a broadcast stream which contains an emergency-related live Audio/Visual service, (ii) a service id field indicating a 16 bit integer that uniquely identifying the emergency-related live Audio/Visual service, (iii) a service name element representing a user-friendly name for a service where a live media is available that a receiver can present to a viewer when presenting an option to tune to the live media element, and (iv) a second language field identifying a language of the service name element of a live media stream, and the first language field and the second language field are represented by formal natural language identifiers and not exceed 35 characters.

2. A companion device for receiving an emergency alert message, the companion device comprising:

a processor, and a memory associated with the processor; wherein the processor is configured to receive the emergency alert message from a primary device on a local area network, the emergency alert message includes (i) an event description element representing a description of an emergency event and (ii) a live media element representing an identification of an Audio/Visual service, the event description element includes a first language field identifying a language of the event description element of the emergency alert message, the live media element includes (i) a bsid field representing an identifier of a broadcast stream which contains an emergency-related live Audio/Visual service, (ii) a service id field indicating a 16 bit integer that uniquely identifying the emergency-related live Audio/Visual service, (iii) a service name element representing a user-friendly name for a service where a live media is available that a receiver can present to a viewer when presenting an option to tune to the live media element, and (iv) a second language field identifying a language of the service name element of a live media stream, and the first language field and the second language field are represented by formal natural language identifiers and not exceed 35 characters.

3. A method for transferring an emergency alert message, the method including:

receiving the emergency alert message; and transferring the emergency alert message to a companion device on a local area network; wherein the emergency alert message includes (i) an event description element representing a description of an emergency event and (ii) a live media element representing an identification of an Audio/Visual service, the event description element includes a first language field identifying a language of the event description element of the emergency alert message, the live media element includes (i) a bsid field representing an identifier of a broadcast stream which contains an emergency-related live Audio/Visual service, (ii) a service id field indicating a 16 bit integer that uniquely identifying the emergency-related live Audio/Visual service, (iii) a service name element representing a user-friendly name for a service where a live media is available that a receiver can present to a viewer when presenting an option to tune to the live media element, and (iv) a second language field identifying a language of the service name element of a live media stream, and the first language field and the second language field are represented by formal natural language identifiers and not exceed 35 characters.

\* \* \* \* \*